United States Patent
Wang et al.

(10) Patent No.: US 12,350,644 B2
(45) Date of Patent: Jul. 8, 2025

(54) PRODUCT FOR PFAS ADSORPTION

(71) Applicant: Active Minerals International, LLC, Sparks, MD (US)

(72) Inventors: Bo Wang, Union City, CA (US); Thomas Scott Cortner, Spring, TX (US); Dennis Parker, Victor, ID (US)

(73) Assignee: Active Minerals International, LLC, Sparks, MD (US)

( * ) Notice: Subject to any disclaimer, the term of this patent is extended or adjusted under 35 U.S.C. 154(b) by 436 days.

(21) Appl. No.: 17/865,721

(22) Filed: Jul. 15, 2022

(65) Prior Publication Data

US 2024/0017240 A1 Jan. 18, 2024

(51) Int. Cl.
*B01J 20/22* (2006.01)
*B01J 20/12* (2006.01)
(Continued)

(52) U.S. Cl.
CPC ............... *B01J 20/22* (2013.01); *B01J 20/12* (2013.01); *B01J 20/28004* (2013.01); *B01J 20/28016* (2013.01); *B01J 20/28059* (2013.01); *B01J 20/28061* (2013.01); *B01J 20/3204* (2013.01); *B01J 20/3219* (2013.01); *B01J 20/3259* (2013.01); *B01J 20/3295* (2013.01); *C02F 1/288* (2013.01); *C02F 1/281* (2013.01); *C02F 1/285* (2013.01); *C02F 2101/36* (2013.01)

(58) Field of Classification Search
None
See application file for complete search history.

(56) References Cited

U.S. PATENT DOCUMENTS

| 4,444,665 A | 4/1984 | Hildebrandt |
| 6,262,162 B1 | 7/2001 | Lan et al. |
| (Continued) | | |

FOREIGN PATENT DOCUMENTS

| CN | 106390933 A | | 2/2017 | |
| CN | 113184867 A | * | 7/2021 | ......... B01D 17/0202 |
| (Continued) | | | | |

OTHER PUBLICATIONS

English translation of CN113184867 (Year: 2024).*
(Continued)

*Primary Examiner* — Chester T Barry
(74) *Attorney, Agent, or Firm* — Merchant & Gould P.C.

(57) ABSTRACT

A product for adsorbing one or more PFAS from a liquid is disclosed. The product may comprise attapulgite that has been surface functionalized with (a) a quaternary amine surface coating solution that comprises a mono-quaternary amine compound or a di-quaternary amine compound and (b) a mercapto surface coating solution that comprises a surface coating agent that includes one or more mercapto groups that chemically bond to the attapulgite surface. When the quaternary amine surface coating solution includes the mono-quaternary amine compound, the product is free of di-quaternary amines. When the quaternary amine surface coating solution includes the di-quaternary amine compound, the product is free of mono-quaternary amines. Also disclosed is a method of producing the product and a method of adsorbing a PFAS in a liquid using the product.

28 Claims, 6 Drawing Sheets

Natural attapulgite — Surface functionalized with quaternary amine — Surface functionalized with mercapto silane — Spent adsorbent

(51) Int. Cl.
  *B01J 20/28* (2006.01)
  *B01J 20/32* (2006.01)
  *C02F 1/28* (2023.01)
  *C02F 101/36* (2006.01)

(56) References Cited

U.S. PATENT DOCUMENTS

| | | |
|---|---|---|
| 7,510,992 B2 | 3/2009 | Wang et al. |
| 9,199,184 B2 | 12/2015 | Mallavarapu et al. |
| 9,284,201 B2 | 3/2016 | Kambala et al. |
| 11,000,822 B2 | 5/2021 | Donovan |
| 2013/0059942 A1 | 3/2013 | Ono et al. |
| 2020/0239332 A1 | 7/2020 | Kevern et al. |
| 2020/0368717 A1 | 11/2020 | Donovan |

FOREIGN PATENT DOCUMENTS

| | | | |
|---|---|---|---|
| DE | 202021003332 U1 | | 3/2023 |
| WO | WO-2024049709 A | * | 3/2020 |
| WO | 2021237050 A1 | | 11/2021 |

OTHER PUBLICATIONS

Chi Thanh Vu, et al., "Adsorption of short-chain perfluoroalkyl acids (PFAAs) from water/wastewater", Environmental Science Water Research & Techology, Royal Society of Chemistry, https://doi.org/10.1039/D0EW00468E, May 13, 2020, DOI: 10.1039/d0ew00468e.

Qin Zhou, et al., "Sorption of perfluorooctane sulfonate on organo-montmorillonites", Chemosphere, https://doi.org/10.1016/j.chemosphere.2009.12.005, Oct. 2, 20096, DOI: 10.1016/j.chemosphere.2009.12.005.

Chenyang Wang, et al., "Modified clays reduce leaching of per- and polyfluoroalkyl substances from AFFF-contaminated soils", Emerging Contamination Article Topical Collection on PFAS Analytics and Treatment, Awwa Water Science, https://doi.org/10.1002/aws2.1241, Mar. 18, 2021, DOI: 10.1002/aws2.1241.

Nanthi Bolan, et al., "Remediation of poly- and perfluoroalkyl substances (PFAS) contaminated soils—To mobilize or to immobilize or to degrade?", Journal of Hazardous Materials, https://doi.org/10.1016/j.jhazmat.2020.123892, Sep. 9, 2020.

Vesna M. Marjanović, et al., "Functionalization of thermo-acid activated sepiolite by amine-silane and mercapto-silane for chromium(VI) adsorption from aqueous solutions", National Library of Serbia, Oct. 26, 2012, vol. 67, Issue 5, pp. 715-728, DOI: 10.2298/HEMIND121026117M.

Efficient PFAS Removal by Amine-Functionalized Sorbents: Critical Review of the Current Literature by Ateia et al. (Environ. Sci. Technol. Lett. 2019, 6, 688-695) Publishes 2019; https://pubs.acs.org/doi/epdf/10.1021/acs.estlett.9b00659.

International Search Report and Written Opinion related to Application No. PCT/US23/26674; reported on Jan. 4, 2024.

Gunarathne, V., et al., Immobilization of per- and polyfluorinated alkyl substances (PFAS) from field contaminated groundwater by a novel organo-clay vs. colloidal activated carbon under flow conditions, Journal of Hazardous Materials, vol. 488 (2025), 137273 (Year: 2025), 13 pages.

Huggett, J. M., "Clay Materials" chapter (excerpt), Encyclopedia of Geology, 2005 (Year: 2005), 1 page.

Melo, et al., Ecotoxicological effects of per- and polyfluoroalkyl substances (PFAS) and of a new PFAS adsorbing organoclay to immobilize PFAS in soils on earthworms and plants, J Haz Matl, vol. 433, (25-Mar. 2022), 128771, https://doi.org/10.1016/j.jhazmat.2022.128771. (Year: 2022), 11 pages.

Milliporesigma, Sepiolite powder, product 70253, https://www.sigmaaldrich.com/US/en/product/aldrich/70253# product-documentation (downloaded Mar. 16, 25) (Year: 2025), 9 pages.

Mukhopadhyay, Raj et al., Natural and engineered clays and clay minerals for the removal of poly- and perfluoroakly substances from water; State-of-the-are and future perspectives, Advances in Colloid and Interface Science 297 (2021) 102537, 16 pages.

Rosmawati, Da, et al., Economic Evaluation on the Production of Poly-DADMAC and Sepiolite Nanocomposite, International Journal of Research and Applied Technology, 1(1)(2021) 162-172 (Year: 2021).

Ruiz-Hitzky, E., et al., Fibrous Clay Mineral-Polymer Nanocomposites, Developments in Clay Science, vol. 5A (2013), p721-7 41, http://dx.doi.org/10.1016/B978-0-08-098258-8.00023-7 (Year: 2013).

Suarez, M., et al., Variability of the surface properties of sepiolite, Applied Clay Science, vols. 67-68, 2012, pp. 72-82 (Year: 2012).

* cited by examiner

SEM image of natural attapulgite feed material at x25000 magnification

SEM images at x200000 magnification

Total PFAS Removal Efficiency in 40 ppt PFAS solution

Impact of Mercapto Surface Coating Solution and Quaternary Amine Surface Coating Solution Treatments on Removal of Selected PFAS Substances in 40 ppt PFAS Solution

PRODUCT FOR PFAS ADSORPTION

TECHNICAL FIELD

The present disclosure generally relates to products comprising attapulgite that are suitable for the adsorption of PFAS from liquids.

BACKGROUND

Perfluorinated substances and polyfluoroalkyl substances (each conventionally referred to as PFAS and collectively referred to as PFAS) are a group of man-made chemicals that include, but are not limited to, Perfluorobutanoic acid (PFBA), Perfluoropentanoic acid (PFPeA), Perfluorohexanoic acid (PFHxA), Perfluoroheptanoic acid (PFHpA), Perfluorooctanoic acid (PFOA), Perfluorononanoic acid (PFNA), Perfluorodecanoic acid (PFDA), Perfluoroundecanoic acid (PFUnA), Perfluorododecanoic acid (PFDoA), Perfluorotridecanoic acid (PFTriA), Perfluorotetradecanoic acid (PFTeA), Perfluorohexadecanoic acid, Perfluorooctadecanoic acid, Perfluorobutanesulfonic acid (PFBS), Perfluoropentanesulfonic acid (PFPeS), Perfluorohexanesulfonic acid (PFHxS), Perfluoroheptanesulfinic Acid (PFHpS), Perfluorooctanesulfonic acid (PFOS), Perfluorononanesulfonic acid (PFNS), Perfluorodecanesulfonic acid (PFDS), Perfluorododecanesulfonic acid (PFDoS), Perfluorooctanesulfonamide (FOSA), N-ethylperfluoro-1-octanesulfonamide, NMeFOSA, N-methylperfluorooctanesulfonamidoacetic acid (NMeFOSAA), N-ethylperfluorooctanesulfonamidoacetic acid (NEtFOSAA), 2-(N-methylperfluoro-1-octanesulfonamido) ethanol, 2-(N-ethylperfluoro-1-octanesulfonamido) ethanol, 4:2 FTS, 6:2 FTS, 8:2 FTS, 10:2 FTS, HFPO-DA, 9-Chlorohexadecafluoro-3-oxanonane-1-sulfonic acid, 11-Chlorocicosafluoro-3-oxaundecane-1-sulfonic acid, or the like chemicals. PFAS have been and are widely used in industry and in consumer products. PFAS are considered as emerging contaminates. PFAS pollutants in industrial and municipal wastewaters can find their way into groundwater, water bodies and other water environments, posing health risk to humans and wildlife. PFAS are known to be relatively stable chemicals with long-term persistence. PFAS have been found in the blood of people and animals all over the world. PFAS are present at low levels in a variety of food products and in the environment. Studies have indicated that exposure to some PFAS in the environment may be linked to harmful health effects in humans and animals. Remediation of PFAS contaminated water tends to be very challenging.

Common commercially available removal technologies include activated carbon adsorption, anion exchange resin, and high pressure membranes. Activated carbon is a less efficient technology. Anion exchange resin and high-pressure membranes technologies are expensive due to the high material cost and equipment cost.

U.S. Pat. No. 9,284,201 issued Mar. 15, 2016, (the '201 Patent) describes a process for modified clay sorbents using oleyl amine and octyl amine or a mixture thereof. An effective and less expensive removal media is desired that is capable of separating PFAS from liquids.

SUMMARY OF THE DISCLOSURE

In one aspect of the present disclosure, a product for adsorbing at least one PFAS in a liquid is disclosed. The product may comprise attapulgite that has been surface functionalized with: (a) a quaternary amine surface coating solution that includes a mono-quaternary amine compound or a di-quaternary amine compound, the mono-quaternary amine compound comprising one or more mono-quaternary amines that attach to the attapulgite surface, the di-quaternary amine compound comprising one or more di-quaternary amines that attach to the attapulgite surface, and (b) a surface coating agent that includes one or more mercapto groups that chemically bond to the attapulgite surface, wherein when the quaternary amine surface coating solution includes one or more mono-quaternary amine compounds, the product is free of di-quaternary amines, wherein when the quaternary amine surface coating solution includes one or more di-quaternary amine compounds, the product is free of mono-quaternary amines, wherein the product has a surface area in the range of 45-160 m2/g or 50-100 m2/g as measured using the BET method, wherein the product has a particle size distribution having a d50 of 6-30 microns or 10-25 microns or 12-25 microns or 12-23 microns.

In an embodiment, the surface coating agent may be mercapto silane.

In any one or the embodiments above, the product may be in powder form and/or free of extrusion.

In any one of the embodiments above, the product may have a PFAS removal efficiency for the at least one PFAS of 70-100%, 80-100%, 90-100%, 95-100% or 97-100% in 12-25 hours in the liquid at a loading of 0.5-2 g of the product per liter of the liquid.

In any one of the embodiments above, the product may have a porosity of 40-90% and a pore volume of 0.7-1.5 mL/g.

In any one of the embodiments above, the weight percentage of components of the product includes: 85-94 wt. % attapulgite; 2.5-15 wt. % of: (i) mono-quaternary amines or (ii) di-quaternary amines; and 1-8 wt. % surface coating agent.

In any one of the embodiments above, the product may be free of oleyl amine and octyl amine.

In any one of the embodiments above, the product may be free of residual acid.

In another aspect of the disclosure, a method of producing a product for adsorbing at least one PFAS from a liquid is disclosed. The method may comprise selecting an attapulgite as feed material, wherein prior to surface treatment the attapulgite selected as feed material contains 7-16 wt. % or 9-14 wt. % moisture when measured at a temperature of 104° C. The method further comprises surface treating the attapulgite with a quaternary amine surface coating solution, the quaternary amine surface coating solution including (i) a mono-quaternary amine compound, the mono-quaternary amine compound comprising one or more mono-quaternary amines that attach to the surface of the attapulgite or (ii) a di-quaternary amine compound, the di-quaternary amine compound comprising one or more di-quaternary amines that attach to the surface of the attapulgite; and surface treating the attapulgite with a mercapto surface coating solution, the mercapto surface coating solution including a surface coating agent that includes one or more mercapto groups that chemically bond to the surface of the attapulgite, wherein the product produced has a surface area in the range of 45-160 m2/g as measured using the BET method, wherein when the quaternary amine surface coating solution includes the mono-quaternary amine compound, the product is free of di-quaternary amines, wherein when the quaternary amine surface coating solution includes the di-quaternary amine compound, the product is free of mono-quaternary amines.

In an embodiment, the weight percentage of components of the product may include: 85-94 wt. % attapulgite; 2.5-15 wt. % of (i) one or more mono-quaternary amines or (ii) one or more di-quaternary amines; and 1-8 wt. % surface coating agent that includes the one or more mercapto groups, wherein the product is free of oleyl amine and octyl amine.

In any one of the embodiments of the method above, the quaternary amine surface coating solution may further include water, wherein the mercapto surface coating solution further includes a solvent, and wherein the surface coating agent comprises mercapto silane.

In any one of the embodiments of the method above, the surface treating of the attapulgite with a mercapto surface coating solution may be subsequent to the surface treating of the attapulgite with a quaternary amine surface coating solution.

In any one of the embodiments of the method above, the quaternary amine surface coating solution may further include water.

In any one of the embodiments of the method above, the method may further comprise drying the attapulgite, wherein: (a) the one or more mono-quaternary amines are dried on the attapulgite of the product produced or the one or more di-quaternary amines are dried on the attapulgite of the product produced. (b) the mercapto surface coating solution is dried on the attapulgite of the product produced, and (c) the product produced is in powder form or is free from extrusion.

In any one of the embodiments of the method above, the product may have a particle size distribution having a $d_{50}$ of 6-30 microns or 10-25 microns or 12-25 microns or 12-23 microns.

In any one of the embodiments of the method above, the product may have a PFAS removal efficiency for the at least one PFAS of 70-100%, 80-100%, 90-100%, 95-100% or 97-100% in 12-25 hours in the liquid at a loading of 0.5-2 g of the product per liter of the liquid.

In yet another aspect of the disclosure, a method for adsorbing at least one PFAS in a liquid is disclosed. The method may comprise: contacting the liquid with a product comprising attapulgite that has been surface functionalized with (a) a quaternary amine surface coating solution that includes a mono-quaternary amine compound or a di-quaternary amine compound, the mono-quaternary amine compound comprising one or more mono-quaternary amines that attach to the attapulgite surface, the di-quaternary amine compound comprising one or more di-quaternary amines that attach to the attapulgite surface and (b) a surface coating agent that includes one or more mercapto groups that chemically bond to the attapulgite surface; and separating the product from the liquid to recover a resultant liquid that has a lower amount of PFAS than the liquid had prior to the mixing, wherein the weight percentage of the components of the product includes: 85-94 wt. % attapulgite, 2.5-15 wt. % of (i) one or more mono-quaternary amines or (ii) one or more di-quaternary amines, and 1-8 wt. % surface coating agent that includes the one or more mercapto groups, wherein when the quaternary amine surface coating solution includes one or more mono-quaternary amine compounds, the product is free of di-quaternary amine compounds, wherein when the quaternary amine surface coating solution includes one or more di-quaternary amine compounds, the product is free of mono-quaternary amine compounds, wherein the product has a surface area in the range of 45-160 m2/g as measured using the BET method, wherein the removal efficiency of the product for a PFAS is 10-100%, at a loading of 0.5-2 g of the product per liter of the liquid.

In any one of the embodiments of the method above, the liquid may include water, edible oil, wastewater, process water or combinations thereof.

In any one of the embodiments of the method above, the surface coating agent may comprise mercapto silane.

In any one of the embodiments of the method above, when the contacting is for 12-25 hours, and the PFAS removal efficiency of the product for the at least one PFAS is 70-100%, 80-100%, 90-100%, 95-100 or 97-100% at a loading of 0.5-2 g of the product per liter of the liquid.

DETAILED DESCRIPTION

Figure 1A:
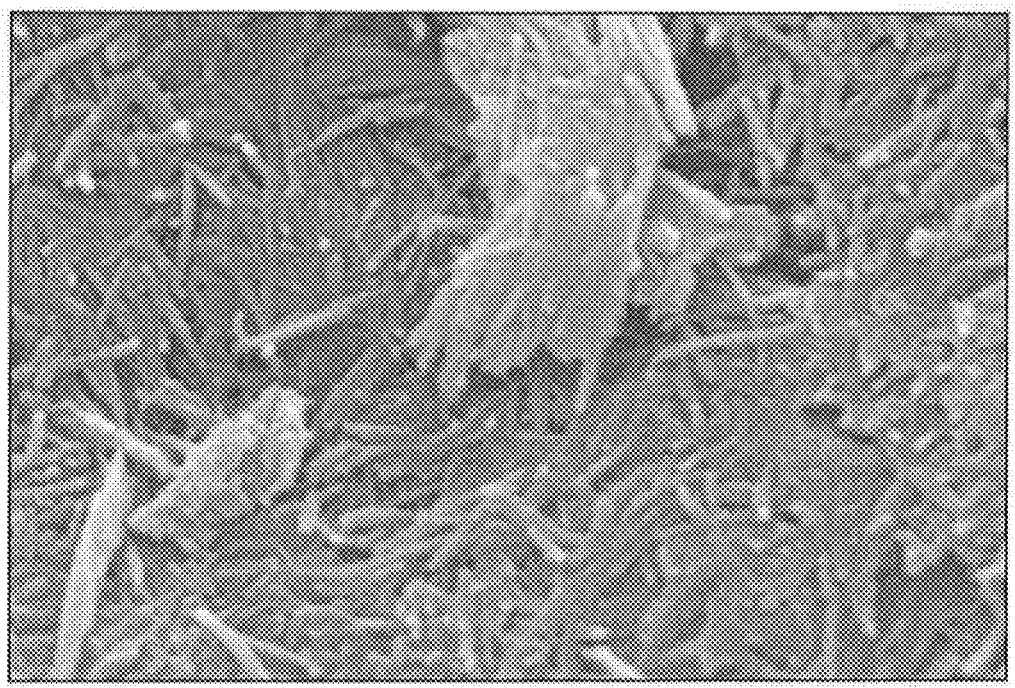
FIG. 1A is SEM image of feed material comprising natural attapulgite at ×25000 magnification.

This disclosure relates to products for PFAS adsorption from liquids. The products disclosed herein comprise attapulgite. Attapulgite is sometimes referred to as palygorskite. To avoid confusion, as used herein, the term "attapulgite" means attapulgite and/or palygorskite. As is known in the art, attapulgite is a chain crystal lattice type of clay mineral that is structurally different from other clays such as montmorillonite or bentonite. Namely, the tetrahedral sheets of attapulgite are divided into ribbons by inversion because adjacent bands of tetrahedra within one tetrahedral sheet point in opposite directions rather than in one direction thus creating a structure of ribbons of 2:1 layers joined at their edges, and the octahedral sheets are continuous in two dimensions only.

Typically, activated carbon is utilized for PFAS adsorption. However, it is a less efficient technology. Other technologies such as anion exchange resin and high-pressure membranes technologies are expensive due to the high material cost and equipment cost.

Disclosed herein are novel products that may be used as adsorbents for at least one PFAS in a liquid. Such liquid may include, but is not limited to, water (e.g., freshwater, sea water, or the like), edible oil, wastewater, process water or combinations thereof. For example, the liquid may include or may be water in oil, or oil in water. Such novel product for reducing the at least one PFAS in such liquid may comprise attapulgite that has been surface functionalized with (a) a quaternary amine surface coating solution that includes a mono-quaternary amine compound or a di-quaternary amine compound, the mono-quaternary amine compound comprising one or more mono-quaternary amines that attach to the attapulgite surface, the di-quaternary amine compound comprising one or more di-quaternary amines that attach to the attapulgite surface, and (b) a mercapto surface coating solution that comprises a surface coating agent that includes one or more mercapto groups that chemically bond to the attapulgite surface. The weight percentage of components of such product may include: 85-94 wt. % attapulgite; 2.5-15 wt. % of (i) one or more mono-quaternary amines or (ii) one or more di-quaternary amines; and 1-8 wt. % surface coating agent that includes the one or more mercapto groups. When the quaternary amine surface coating solution includes one or more mono-quaternary amine compounds, the product is free of all di-quaternary amines. When the quaternary amine surface coating solution includes one or more di-quaternary amine compounds, the product is free of all mono-quaternary amines. The quaternary amine surface coating solution may further comprise water. The mercapto surface coating solution may further comprise a solvent.

The natural attapulgite (as feed material) may have a surface area in the range of 90-160 $m^2/g$ or 120-145 $m^2/g$ or 130-145 $m^2/g$ as measured using the Brunauer-Emmett-Teller (BET) theory. In any one of the embodiments above the natural attapulgite (as feed material) may have a particle size distribution having a $d_{50}$ of 5-25 microns or 6-18 microns or 8-17 microns or 10-15 microns. In any one of the embodiments above the natural attapulgite (as feed material) may have a porosity of 50-90%, or 55-80% or 60-75%. In any one of the embodiments above the natural attapulgite (as feed material) may have a pore volume of 0.8-3 mL/g or 0.9-2 mL/g or 1-1.2 mL/g. In any one or more of the embodiments or refinements above, for the natural attapulgite (as feed material) the peak position of the intrinsic pores may be in the range of about 5 nm to about 25 nm and/or the peak position of the inter pores may be in the range of about 2 microns to about 16 microns. In a refinement, for the natural attapulgite (as feed material) the peak position of the intrinsic pores may be in the range of about 10 nm to about 18 nm and/or the peak position of the inter pores may be in the range of about 2.5 microns to about 10 microns.

The product (e.g., attapulgite after surface functionalization) may have a surface area in the range of 45-160 $m^2/g$ or 45-150 $m^2/g$ or 45-130 $m^2/g$ or 50-100 $m^2/g$ as measured using the Brunauer-Emmett-Teller (BET) theory. In any one of the embodiments above the product (e.g., attapulgite (after surface functionalization) may have a particle size distribution having a $d_{50}$ of 6-30 microns or 10-25 microns or 12-25 microns or 12-23 microns. In any one of the embodiments above the product (e.g., attapulgite after surface functionalization) has a porosity of 40-90% or 40-80%, or 50-75% or 55-70%. In any one of the embodiments above the product (e.g., attapulgite after surface functionalization) may have a pore volume of 0.7-1.5 mL/g or 0.9-1.2 mL/g or about 0.9-1.0 mL/g. In any one or more of the embodiments or refinements above, for the product the peak position of the intrinsic pores may be in the range of about 5 nm to about 35 nm and/or the peak position of the inter pores may be in the range of about 2 microns to about 20 microns. In a refinement, for the product the peak position of the intrinsic pores may be in the range of about 10 nm to about 25 nm and/or the peak position of the inter pores may be in the range of about 3 microns to about 11 microns. In any one or more of the embodiments above, the product may be in powder form or non-extruded form (free of extrusion before or after surface functionalization). In any one or more of the embodiments above, the attapulgite may be or may comprise: (a) natural attapulgite that prior to surface functionalization may be free of heat treatment (at 300° C. to about 1000° C.), and/or free of calcination (e.g., at about 1000° C. or above). In any one or more of the embodiments above, the attapulgite may be in powder form. In any one or more of the embodiments above, the attapulgite has not been extruded (is free of extrusion either before or after the surface functionalization).

In any one of the embodiments above, the product may have a PFAS removal efficiency for the PFAS of 70-100%, 80-100%, 90-100%, 95-100%, or 97-100% in 12-25 hours in the liquid at a loading of 0.5-2 g of the product per liter of the liquid or a loading of 1-1.3 g of the product per liter of the liquid. For example, in an embodiment, the product may have a PFAS removal efficiency of 70%-100% in about 12-25 hours contact time in the liquid at a loading of 0.5-2 g of the product per liter of the liquid; in a refinement, the product may have a PFAS removal efficiency of 80%-100% in about 12-25 hours contact time in the liquid at a loading of 0.5-2 g of the product per liter of the liquid; in a refinement, the product may have a PFAS removal efficiency of 90%-100% in about 12-25 hours contact time in the liquid at a loading of 0.5-2 g of the product per liter of the liquid; in another refinement, the product may have a PFAS removal efficiency of 95%-100% in about 12-25 hours contact time in the liquid at a loading of 0.5-2 g of the product per liter of the liquid, the product may have a PFAS removal efficiency of 97%-100% in about 12-25 hours contact time in the liquid at a loading of 0.5-2 g of the product per liter of the liquid.

In any one of the embodiments above, the product may have a total PFAS removal efficiency for a plurality of PFAS in the liquid of 10-95%, 15-95% or 18-95% in a contact/mixing time of 12-25 hours in the liquid at a loading of 0.5-2 g of the product per liter of the liquid;

In any one or more of the embodiments or refinements above the attapulgite or the product is free of acid activation. In any one or more of the embodiments or refinements above, the attapulgite or the product may be free of residual acid (acid-free).

In any one or more of the embodiments or refinements above the product is free of free of oleyl amine and octyl amine.

Preparation of the Product

Figure 1B:
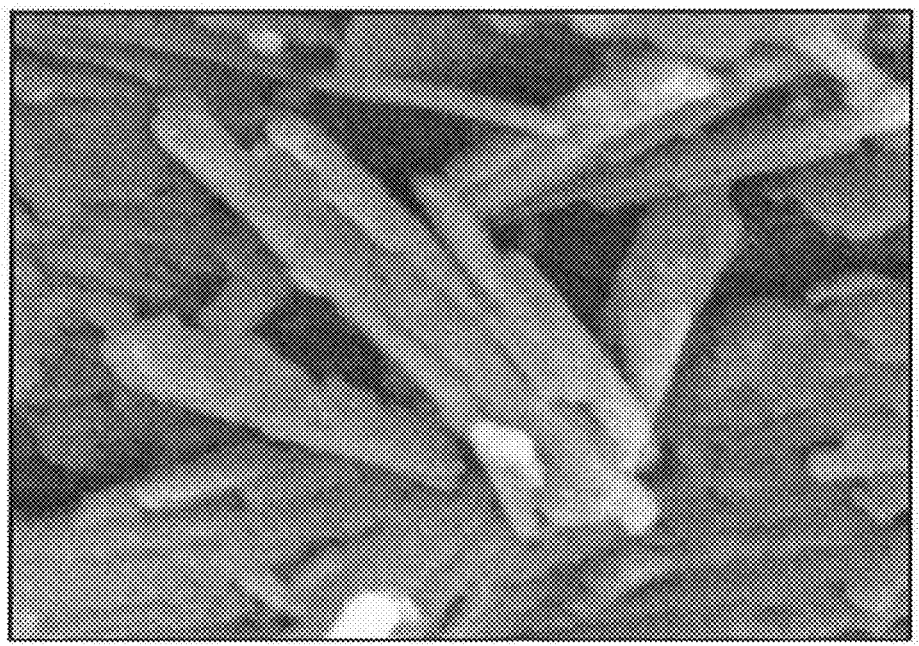
FIG. 1B is SEM image of feed material comprising natural attapulgite at ×200000 magnification.

The method of producing the products discussed herein may comprise: selecting an attapulgite. Attapulgite/palygorskite is a magnesium aluminium phyllosilicate with the chemical formula $(Mg,Al)_2Si_4O_{10}(OH)\cdot 4H_2O$. The percentages of the various elements may vary depending on the deposit from which the attapulgite is sourced. In any one or more of the embodiments above, the attapulgite may be or may comprise natural attapulgite that prior to surface functionalization may be free of heat treatment (at 300° C. to about 1000° C.) and free of calcination (e.g., at about 1000° C. or above). The natural attapulgite selected may have a high surface area in the range of 90 m$^2$/g-160 m$^2$/g, as measured by the nitrogen adsorption method based on the Brunauer-Emmett-Teller (BET) theory, and a particle size (d50) (as measured by a laser particle size analyzer) of 5-25 microns. In a refinement, the natural attapulgite may have surface area in the range of 120 m$^2$/g-145 m$^2$/g, or 130 m$^2$/g-145 m$^2$/g, each as measured by the nitrogen adsorption method based on the Brunauer-Emmett-Teller (BET) theory. In a further refinement, the particle size (d50) of the feed material, as measured by a laser particle size analyzer, may be 6-18 microns, 8-17 microns or 10-15 microns. In each of the embodiments and refinements above, the attapulgite (feed material) may contain 7-16 wt. % or 9-14 wt. % moisture (when measured at 104° C. (220° F.)). FIGS. 1A and 1B are SEM images of feed material comprising natural attapulgite at ×25000 magnification and ×200000 magnification. As can be seen in FIGS. 1A and 1B, the feed material may comprise attapulgite, which may comprise or be a plurality of rod shaped attapulgite particles. While not wishing to be bound by theory, the inventors believe that such moisture content of the attapulgite used as feed material may facilitate the surface coating agent that includes one or more mercapto groups (e.g., mercapto silane) bonding or anchoring to the attapulgite surface. For example, when the surface coating agent is mercapto silane, the silane molecules may first be hydrolyzed by the trace quantities of water present on the surface of the attapulgite, followed by the formation of a covalent bond with the attapulgite surface.

The method includes mixing a quaternary amine compound and water to form a quaternary amine surface coating solution for surface coating the attapulgite. In one embodiment, the quaternary amine compound may comprise (or may be) a mono-quaternary amine compound, wherein the quaternary amine surface coating solution resulting from the mixing is free of di-quaternary amines. In another embodiment, the quaternary amine compound may comprise (or may be) a di-quaternary amine compound, wherein the quaternary amine surface coating solution resulting from the mixing is free of mono-quaternary amines. In other words, in the quaternary amine surface coating solution, if one or more mono-quaternary amine compounds are present, no di-quaternary amines are present. Similarly, in the quaternary amine surface coating solution, if one or more di-quaternary amine compounds are present, no mono-quaternary amines are present.

In various exemplary embodiments discussed herein, the quaternary amine surface coating solution was prepared by mixing 50 wt. % mono-quaternary amine compound (e.g., 10 g of Kemira Superfloc C-577 and 50 wt. % water (e.g., 10 g of deionized (DI) water) for about 10 minutes in a 100 ml glass beaker on a magnetic stirrer plate, although other methods of mixing known in the art could have been utilized. The exemplary mono-quaternary amine compound utilized was Kemira Superfloc C-577 [1,2-Ethanediamine polymer with (chloromethyl)oxirane and N-methylmethanamine in aqueous solution with about 50% concentration]. In other words, the exemplary mono-quaternary amine compound comprised about 50% quaternary amine. The resulting quaternary amine surface coating solution was free of di-quaternary amines. In other embodiments, the quaternary amine surface coating solution may be prepared by mixing other appropriate amounts of mono-quaternary amine compound(s) and water (e.g., DI water). For example, the quaternary amine surface coating solution may comprise 25-56 wt. % mono-quaternary amine compound and 44-75 wt. % water (e.g., DI water), wherein the resulting quaternary amine surface coating solution is free of di-quaternary amines. In other alternative embodiments discussed herein, the quaternary amine surface coating solution was prepared by mixing 50 wt. % di-quaternary amine compound (e.g., 10 g Evonik ADOGEN® 477, N,N,N,N',N'-pentamethyl-N'-tallow alkyltrimethylenediammonium dichloride in aqueous ethanol with about 50% concentration) and 50 wt. % water (e.g., 10 g DI water) until well mixed (e.g., for about 10 minutes) in a 100 ml glass beaker on a magnetic stirrer plate. The exemplary di-quaternary amine compound used (Evonik ADOGEN® 477) comprised about 50% di-quaternary amine. The resulting quaternary amine surface coating solution was free of mono-quaternary amines. In other embodiments, the quaternary amine surface coating solution may comprise other appropriate amounts of di-quaternary amine compound(s) and water (e.g., DI water). For example, the quaternary amine surface coating solution may comprise 33-60 wt. % di-quaternary amine compound and 40-67 wt. % water (e.g., DI water), wherein the resulting quaternary amine surface coating solution is free of mono-quaternary amines.

Figure 2:
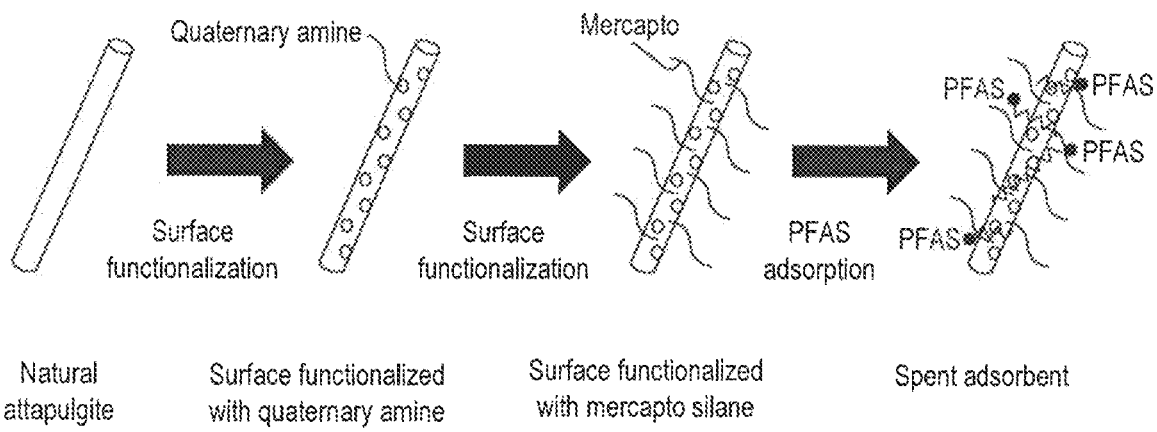
FIG. 2 is a diagram illustrating exemplary surface functionalization and PFAS adsorption.

The method further includes surface treating the attapulgite with the quaternary amine surface coating solution to surface functionalize the attapulgite. In an embodiment, the surface treating may include spraying the quaternary amine surface coating solution onto the attapulgite or otherwise adding/applying the quaternary amine surface coating solution to the attapulgite, and then mixing until the quaternary amine surface coating solution is well dispersed on the attapulgite. In the various embodiments discussed herein, the quaternary amine surface coating solution was sprayed onto the attapulgite, and then the combination of quaternary amine surface coating solution and attapulgite was mixed until the quaternary amine surface coating solution was well dispersed throughout the attapulgite material. For example, in the various embodiments herein about 21 wt. % (25 g) of the quaternary amine surface coating solution was sprayed onto about 79 wt. % (95 g) of the attapulgite feed material and the combination was then mixed in a KitchenAid 5-quart food mixer for about 30 minutes at low speed. In other embodiments, other appropriate amounts of quaternary amine surface coating solution to attapulgite may be utilized to surface functionalize the attapulgite. FIG. 2 diagrammatically illustrates the surface functionalization of the feed material (comprising natural attapulgite) with the quaternary amine surface coating solution. The quaternary amine(s) of the quaternary amine surface coating solution attach to the surface of the attapulgite of the feed material.

The method further includes mixing a solvent and a surface coating agent to form a mercapto surface coating solution for surface coating the attapulgite. The surface coating agent includes one or more mercapto groups. For example, in an embodiment, the surface coating agent may include one or more mercapto groups and silane. In various exemplary embodiments discussed herein, the mercapto surface coating solution was prepared by mixing 20 wt. % of a surface coating agent (e.g., 5 g of gamma-mercaptopropyltrimethoxysilane (Momentive Silquest A-189)) and 80 wt. % of a solvent (e.g., 20 g of ethanol) until well mixed (e.g., for about 10 minutes in a 100 ml glass beaker on a magnetic stirrer plate, although other methods of mixing known in the art could have been utilized). In other embodiments, the mercapto surface coating solution may comprise other appropriate amounts of the surface coating agent and the solvent. For example, the mercapto surface coating solution may comprise about 5-20 wt. % surface coating agent to about 95-80 wt. % solvent.

The method further comprises surface treating the attapulgite with the mercapto surface coating solution to surface functionalize the attapulgite. In one embodiment, the attapulgite that is surface functionalized with the mercapto surface coating solution may have already been surface functionalized with the quaternary amine surface coating solution. FIG. 2 diagrammatically illustrates the surface functionalization of the attapulgite with the mercapto surface coating solution. In the embodiment shown in FIG. 2, the quaternary amine(s) of the quaternary amine surface coating solution are attached to the surface of the attapulgite of the feed material prior to the surface functionalization with the mercapto surface coating solution. The mercapto groups of the mercapto surface coating solution chemically bond to the surface of the attapulgite of the feed material.

In an embodiment, the surface treating may include spraying the mercapto surface coating solution onto the attapulgite or otherwise adding the mercapto surface coating solution to the attapulgite, and then mixing until the mercapto surface coating solution is well dispersed on the attapulgite. In the various embodiments discussed herein, the mercapto surface coating solution was sprayed onto the attapulgite (which had been previously surface functionalized with the quaternary amine surface coating solution) and then the combination was mixed until the mercapto surface coating solution was well dispersed throughout the attapulgite. For example, in the various embodiments herein about 21 wt. % (25 g) of the mercapto surface coating solution was sprayed onto about 79 wt. % (95 g) of the attapulgite material and the combination was then mixed in a KitchenAid 5-quart food mixer for about 30 minutes at low speed. In other embodiments, other appropriate amounts of mercapto surface coating solution to attapulgite may be utilized to surface functionalize the attapulgite. In one embodiment, the mercapto surface coating solution is sprayed/added/applied onto the attapulgite subsequent to the spraying/adding/applying of the quaternary amine surface coating solution (which comprises water (e.g., DI water) and either a mono-quaternary amine compound or a di-quaternary amine compound) onto the attapulgite. The inventors have found that when the attapulgite feed material is first treated with the quaternary amine surface coating solution and subsequently treated with the mercapto surface coating solution, the water (e.g., DI water) in the quaternary amine surface coating solution facilitates mercapto silane hydrolysis reaction and formation of the Si—O—Si—SH bonds on the attapulgite surface, in effect anchoring the mercapto groups to the surface of the attapulgite.

The method may further comprise: after the surface treating of the attapulgite with quaternary amine surface coating solution and the mercapto surface coating solution, drying the (twice) surface treated attapulgite (at about 60-70° C.) in an oven or the like for about 4-6 hours or until the attapulgite is dried (both of the surface treating solutions are dried on the surface of the attapulgite particles). In the embodiment above, after mixing, the mixtures were dried at 60-70° C. in an oven for about 4 hours. In some embodiments, the product produced may be in powder form or may be in a non-extruded (free of extrusion) form. In some embodiments, the attapulgite particles of the resulting product may exhibit a generally rounded granular shape. In other embodiments, the attapulgite particles of the resulting product may exhibit irregular shape. As noted earlier, in an embodiment the attapulgite may be comprised of a plurality of rod shaped attapulgite particles. After surface coating and drying, the quaternary amine(s) are attached to the attapulgite surface and the mercapto group(s) are chemically bonded to the attapulgite surface.

The surface coating agent may comprise (or may be): mercapto silane(s) or non-silane mercapto thiol compound(s) or a mixture thereof. Mercapto silane may include but is not limited to: 3-mercaptopropyltrimethoxysilane; 3-(mercaptopropyl)triethoxysilane; 3-mercaptopropylmethyldimethoxysilane; (mercaptomethyl)dimethylethoxysilane; (mercaptomethyl)methyldiethoxysilane; 3-mercaptomethyltrimethoxysilane, 3-mercaptomethyltriethoxysilane, 11-mercaptoundecyltrimethoxysilane; or mixtures thereof. Non-silane mercapto thiol compound may include but is not limited to: 3-Mercapto-1,2-propanediol, mercaptobenzothiazole, ethanethiol, 1-butanethiol, 1-propanethiol, cyclopentanethiol; or mixtures thereof. The aforementioned lists are exemplary. The mercapto silane is not limited to such listed examples. Non-silane mercapto thiol compounds are not limited to the listed examples. The solvent may include or may be methanol, ethanol, isopropanol, chloroform, toluene, or mixture thereof. In one embodiment, mercapto surface coating solution may include or may be gamma-mercaptopropyltrimethoxysilane and ethanol.

Surface area measurement before and after the surface treatment of the attapulgite with the solution indicates that the surface area decreases after treatment with the quaternary amine surface coating solution and the mercapto surface coating solution (see for example, Table 5).

Description of Test Methods

Surface Area, Pore Volume, Pore Size Distribution, Porosity

Surface area was measured by the nitrogen adsorption method of the BET (Brunauer-Emmett-Teller) method. Pore volume and pore size distribution of a sample of material was determined by mercury porosimetry. The mercury porosimetry uses mercury as an intrusion fluid to measure pore volume of a (weighed) sample of material enclosed inside a sample chamber of a penetrometer. The sample chamber is evacuated to remove air from the pores of the sample. The sample chamber and penetrometer are filled with mercury. Since mercury does not wet the material surface, it must be forced into the pores by means of external pressure. Progressively higher pressure is applied to allow mercury to enter the pores. The required equilibrated pressure is inversely proportional to the size of the pores, only slight pressure is required to intrude the mercury into macropores, whereas much greater external pressure is required to force mercury into small pores. The penetrometer reads the volume of mercury intruded and the intrusion data is used to calculate pore size distribution, porosity, average pore size and total pore volume. A Micromeritics AutoPore IV 9500 was used to analyze the samples herein.

Assuming pores of cylindrical shape, a surface distribution may be derived from the pore volume distribution for use in calculations. An estimate of the total surface area of the sample of material may be made from the pressure/volume curve (Rootare, 1967) without using a pore model as $$A = \frac{1}{\gamma\cos\theta} \int_{V_{Hg,0}}^{V_{Hg,max}} p\, dV$$

Where, A=total surface area
γ=surface tension of the mercury
θ=angle of contact of mercury with the material pore wall
p=external applied pressure
V=pore volume From the function V=V(p) the integral may be calculated by means of a numerical method.

From the pressure versus the mercury intrusion data, the instrument generates volume and size distribution of pores following the Washburn equation (Washburn, 1921) as:

$$d_i = \frac{4\gamma\cos\theta}{P_i}$$

Where, $d_i$=diameter of pore at an equilibrated external pressure
γ=surface tension of the mercury
θ=angle of contact of mercury with the material pore wall
$P_i$=external applied pressure The average pore diameter is determined from cumulative intrusion volume and total surface area of the sample of material as:

$$D = \frac{4V}{S}$$

Where, D=average pore diameter
V=total intrusion volume of mercury
S=total surface area Porosity is the fraction of the total material volume that is taken up by the pore space. Porosity was calculated from mercury intrusion data.

EPA Method 533 (Determination of Per- and Polyfluoroalkyl Substances in Drinking Water by Isotope Dilution Anion Exchange Solid Phase Extraction and Liquid Chromatography/Tandem Mass Spectrometry)

A 100-250 mL sample is fortified with isotopically labeled analogues of the method analytes that function as isotope dilution standards. The sample is passed through a solid-phase extraction (SPE) cartridge containing polystyrene divinylbenzene with a positively charged diamino ligand to extract the method analytes and isotope dilution analogues. The cartridge is rinsed with sequential washes of aqueous ammonium acetate followed by methanol, then the compounds are eluted from the solid phase sorbent with methanol containing ammonium hydroxide. The extract is concentrated to dryness with nitrogen in a heated water bath. The extract volume is adjusted to 1.0 mL with 20% water in methanol (v/v), and three isotopically labeled isotope performance standards are added. Extracts are analyzed by Liquid Chromatography-tandem Mass Spectrometry (LC-MS/MS) in the Multiple Reaction Monitoring (MRM) detection mode. The concentration of each analyte is calculated using the isotope dilution technique. For quality control (QC) purposes, the percent recoveries of the isotope dilution analogues are calculated using the integrated peak areas of isotope performance standards, which are added to the final extract and function as traditional internal standards, exclusively applied to the isotope dilution analogues.

EPA Method SW846 Method 3535A: Solid-Phase Extraction (SPE)

Sample preparation procedures vary by analyte group. For the extraction of some analyte groups, the pH of the sample is adjusted to a specified value prior to extraction. Other groups do not need a pH adjustment. Following any necessary pH adjustment, a measured volume of sample is extracted by passing it through the solid-phase extraction medium (disks or cartridges), which is held in an extraction device designed for vacuum filtration of the sample. Target analytes are eluted from the solid-phase media using an appropriate solvent which is collected in a receiving vessel. The resulting solvent extract is dried using sodium sulfate and concentrated, as needed. As necessary for the specific analysis, the concentrated extract may be exchanged into a solvent compatible extract with subsequent cleanup procedures or determinative procedures for the measurement of the target analytes.

EXAMPLES

The products of Examples 1-12 each comprise attapulgite. The products of Examples 1-12 were prepared from the attapulgite feed material listed in Table 1.

TABLE 1

Attapulgite Feed Material.

| Feed material | Surface Area ($m^2/g$) | d50 (μm) | Pore Volume (mL/g) | Porosity (%) |
|---|---|---|---|---|
| Natural attapulgite | 141 | 13.49 | 1.1935 | 68 |

Feed material was prepared using natural attapulgite mined near Climax. Georgia by Active Minerals International, LLC. The major elemental composition of this feed material, as determined by wave-length dispersive XRF analysis, is shown in Table 2.

TABLE 2

Major Oxide Composition of natural attapulgite material used as feed material (Ignited Basis).
Total Chemistry as determined by XRF (expressed as oxides)[1]

| | |
|---|---|
| $SiO_2$ (wt. %) | 66.2 |
| $Al_2O_3$ (wt. %) | 12.1 |
| $Fe_2O_3$ (wt. %) | 4.2 |
| CaO (wt. %) | 2.8 |
| MgO (wt. %) | 9.9 |
| $K_2O$ (wt. %) | 1.1 |
| $CO_2$ (wt. %) | 1.8 |
| $TiO_2$ (wt. %) | 0.6 |
| $P_2O_5$ (wt. %) | 1.0 |
| $SO_4$ (wt. %) | 0.2 |
| Other | 0.1 |

[1] Although the elements are reported as oxides, they are actually present as complex aluminosilicates.

The feed material utilized had a high surface area of about 141 $m^2/g$, as measured by the nitrogen adsorption method based on the Brunauer-Emmett-Teller (BET) theory. Particle size ($d_{50}$) of this feed material, as measured by a laser particle size analyzer, was around 13.49 microns. The feed material was in powder form and was free of extrusion. The natural attapulgite feed material was free of heat treatment (at 300° C. to about 1000° C.), and/or free of calcination (e.g., at about 1000° C. or above). In any one or more of the embodiments above, the attapulgite may be in powder form.

The feed material contains about 7-16 wt. % or about 9-14 wt. % moisture (at 104° C. (220° F.)). While not being bound by theory, the inventors believe that such moisture facilitates the bonding of the surface coating agent (e.g., mercapto silane) to the attapulgite surface. For example, when the surface coating agent comprises or is mercapto silane, it is believed that the silane molecules may be first hydrolyzed by the trace quantities of water present on the surface of the attapulgite, followed by the formation of a covalent bond with the attapulgite surface.

Tables 3A-3B shows Examples 1-12 were prepared from the feed material, using surface functionalization treatment. In Tables 3A-3B, the weight percentage of the surface coating agent (e.g., mercapto silane) is determined as a percentage of the weight of the resulting adsorbent. More specifically, with regard to the mercapto surface coating solution, the solvent portion (e.g., ethanol), which evaporates away during drying, is not included in the weight of the resulting adsorbent for the calculations of Table 3B. Similarly, in Tables 3A 3B, the weight percentage of quaternary amine (contained in the quaternary amine compound (e.g., about 50% of the weight of the quaternary amine compound used)) is determined as a weight percentage of the resulting adsorbent. With regard to the amine surface coating solution, the DI water portion (which evaporates away during drying) into which the quaternary amine compound is dispersed is not included in the weight of the resulting adsorbent for the calculations of Table 3B.

For instance, in Example 1, the 5 g of mercapto silane is 5 wt. % of the total resulting adsorbent weight of 100 g (5 g mercapto silane plus 95 g attapulgite). In Example 3, the 4.73 g of mercapto silane is 4.7 wt. % of the total adsorbent weight of 99.73 g (4.73 g mercapto silane plus 5 g quaternary amine plus 90 g attapulgite) and the 5 g of quaternary amine is 5 wt. % of the total resulting adsorbent weight of 99.73 g. For clarity, in Example 3, 10 g of a mono-quaternary compound was used, of which 50% (5 g) was quaternary amine. The wt. % of the quaternary amine in DI water is calculated as the wt. % of quaternary amine/(the wt. % of quaternary amine+wt. % of DI water). Similarly, the wt. % of mercapto in solvent is calculated as the wt. % of mercapto silane/(the wt. % of mercapto silane+wt. % of solvent).

TABLE 3A

Surface functionalized natural attapulgite with PFAS Adsorbent prepared at different mercapto silane and quaternary amine loading levels.

| | | Mercapto Surface Coating Solution | | Quaternary Amine Surface Coating Solution | |
|---|---|---|---|---|---|
| Ex | Attapulgite (g) | Mercapto silane (g) | Ethanol (g) | Quaternary Amine* (g) | DI Water (g) |
| 1 | 95 | 5 | 20 | 0 | 0 |
| 2 | 90 | 0 | 0 | 5 | 10 |
| 3 | 90 | 4.73 | 20 | 5 | 10 |
| 4 | 94 | 1 | 20 | 2.5 | 15 |
| 5 | 90 | 5 | 20 | 2.5 | 15 |
| 6 | 88 | 3 | 20 | 4.5 | 15 |
| 7 | 80 | 5 | 20 | 7.5 | 15 |
| 8 | 80 | 1 | 20 | 9.5 | 15 |
| 9 | 76 | 5 | 20 | 9.5 | 15 |
| 10 | 94 | 1 | 20 | 2.5 | 10 |
| 11 | 88 | 3 | 20 | 4.5 | 10 |
| 12 | 80 | 5 | 20 | 7.5 | 10 |

*Quaternary amine weight was about 50% of the exemplary quaternary amine compound used

TABLE 3B

Surface functionalized natural attapulgite with PFAS Adsorbent prepared at different mercapto silane and quaternary amine loading levels.

| Ex | Mercapto silane (wt. %) | Quaternary Amine (wt. %) | Mercapto silane + Quaternary Amine (wt. %) | Quaternary Amine in DI water* (wt. %) | Mercapto Silane in solvent** (wt. %) |
|---|---|---|---|---|---|
| 1 | 5.0 | 0 | 5.0 | 0 | 20 |
| 2 | 0 | 5.3 | 5.3 | 33 | 0 |
| 3 | 4.7 | 5 | 9.8 | 33 | 19 |
| 4 | 1.0 | 2.6 | 3.6 | 14 | 5 |
| 5 | 5.1 | 2.6 | 7.7 | 14 | 20 |
| 6 | 3.1 | 4.7 | 7.9 | 23 | 13 |
| 7 | 5.4 | 8.1 | 13.5 | 33 | 20 |
| 8 | 1.1 | 10.5 | 11.6 | 39 | 5 |
| 9 | 5.5 | 10.5 | 16.0 | 39 | 20 |
| 10 | 1.0 | 2.6 | 3.6 | 20 | 5 |
| 11 | 3.1 | 4.7 | 7.9 | 31 | 13 |
| 12 | 5.4 | 8.1 | 13.5 | 43 | 20 |

*wt. % quaternary amine/(wt. % quaternary amine + wt. % DI water)
**wt. % mercapto silane/(wt. % mercapto silane + wt. % solvent)

Example 1

Example 1 was prepared using a mercapto silane surface functionalization treatment. A mercapto surface coating solution for surface coating the natural attapulgite was prepared by mixing 5 g of a surface coating agent [gamma-mercaptopropyltrimethoxysilane (Momentive Silquest A-189)] with 20 g of solvent (ethanol) for 10 minutes in a 100 ml glass beaker on a magnetic stirrer plate. 95 g of the attapulgite feed material was mixed with 25 g of the mercapto surface coating solution in a KitchenAid 5-quart food mixer. After mixing for 30 minutes at low speed, the mixture was dried at 60-70° C. in an oven for four hours.

Example 2

Example 2 was prepared using a quaternary amine surface functionalization treatment. A quaternary amine surface coating solution for surface coating the attapulgite was prepared by mixing 10 g of Kemira Superfloc C-577 (mono-quaternary amine compound, 1,2-Ethanediamine polymer with (chloromethyl)oxirane and N-methylmethanamine]) in 10 g of DI water for 10 minutes in a 100 ml glass beaker on a magnetic stirrer plate. The weight of the mono-quaternary amines in the exemplary mono-quaternary compound (Kemira Superfloc C-577) is estimated to be about 50% of the total weight of the Kemira Superfloc C-577 solution. As such, in Example 2, the mono-quaternary amine compound (Kemira Superfloc C-577) included about 5 g mono-quaternary amine. 90 g of the attapulgite feed material was mixed with 20 g of the quaternary amine surface coating solution in a KitchenAid 5-quart food mixer. After mixing for 30 minutes at low speed, the mixture was dried at 60-70° C. in an oven for four hours.

Examples 3-9

Each of Examples 3 to 9 were prepared using dual surface treatments with a quaternary amine surface coating solution and a mercapto surface coating solution. Table 3A-3B show the varying loading levels utilized for the quaternary amine surface coating solution and for the mercapto surface coating solution to study the impact of the PFAS affinity functional groups on PFAS removal.

As discussed earlier, the quaternary amine surface coating solution comprises a quaternary amine compound and water (the quaternary amine compound is dispersed in the DI water). In Examples 3-9, the quaternary amine surface coating solution for surface coating the attapulgite was prepared by mixing Kemira Superfloc C-577 (mono-quaternary amine compound, 1,2-Ethanediamine polymer with (chloromethyl)oxirane and N-methylmethanamine)) in DI water for 10 minutes in a 100 ml glass beaker on a magnetic stirrer plate. Then the attapulgite feed material was mixed with the quaternary amine surface coating solution in a KitchenAid 5-quart food mixer for about 30 minutes at low speed. In Examples 3-9, the quaternary amine compound comprised (or was) a mono-quaternary amine compound, thus the quaternary amine surface coating solutions of Examples 3-9 each comprised a mono-quaternary amine compound and DI water. The weight of the mono-quaternary amines in the exemplary mono-quaternary compound (Kemira Superfloc C-577) is estimated to be about 50% of the total weight of the Kemira Superfloc C-577 solution used. Furthermore, each of the quaternary amine surface coating solutions of Examples 3-9 was free of di-quaternary amine(s) and was also free of oleyl amine and free of octyl amine.

As can be seen in Tables 3A-3B, varying loading levels of the surface coating agent and solvent were utilized in Examples 3-9 for the mercapto surface coating solution. As discussed earlier, the mercapto surface coating solution comprises a surface coating agent and solvent. The surface coating agent comprises one or more mercapto groups. In Examples 3-9, the surface coating agent comprised silane and one or more mercapto groups. The surface coating agent is referred to in Tables 3A-3B as "mercapto silane". In each of Examples 3-9 the surface coating agent utilized was gamma-mercaptopropyltrimethoxysilane (Momentive Silquest A-189)) and the solvent was ethanol.

In Examples 3-9, the mercapto surface coating solution for surface coating the attapulgite was prepared by mixing the surface coating agent (mercapto silane) in solvent (ethanol) for 10 minutes in a 100 ml glass beaker on a magnetic stirrer plate. Then the attapulgite feed material, which had been previously surface functionalized with the quaternary amine surface coating solution, was then mixed with the mercapto surface coating solution in a KitchenAid 5-quart food mixer. After mixing for 30 minutes at low speed, the mixtures were dried at 60-70° C. in an oven for four hours. The resulting adsorbent was in powder form and free of extrusion and free of acid activation and free of residual acid (acid-free).

Table 4 lists pore volume, porosity and particle size distribution (psd) of the feed material and Examples 4 and 7.

TABLE 4

Pore Volume, Porosity and Particle Size Distribution.

| Examples | Pore volume (mL/g) | Porosity (%) | $d_{50}$ (μm) |
|---|---|---|---|
| Feed Material | 1.1935 | 68 | 13.49 |
| Example 4 | 0.9658 | 58 | 12.25 |
| Example 7 | 0.9691 | 63 | 22.35 |

Example 10-12

Examples 10 to 12 were prepared using dual surface treatments and drying similar to Examples 3 to 9 except each quaternary amine compound comprised a di-quaternary amine compound, thus the quaternary amine surface coating solutions of Examples 10-12 each comprised di-quaternary amine compound and DI water. More specifically, in Examples 10-12, the quaternary amine surface coating solution for surface coating the attapulgite was prepared by mixing Evonik ADOGEN® 477, N,N,N,N',N'-pentamethyl-N'-tallow alkyltrimethylenediammonium dichloride (di-quaternary amine compound) in DI water for 10 minutes in a 100 mil glass beaker on a magnetic stirrer plate. The weight of the di-quaternary amines in the exemplary di-quaternary compound (Evonik ADOGEN® 477) is estimated to be about 50% of the total weight of the Evonik ADOGEN® 477 solution used. Then the attapulgite feed material was mixed with the quaternary amine surface coating solution in a KitchenAid 5-quart food mixer for about 30 minutes at low speed. Each of the quaternary amine surface coating solutions of Examples 10-12 was free of mono-quaternary amine(s) and was also free of oleyl amine and free of octyl amine. After the amine surface functionalized attapulgite was further surface functionalized with the mercapto surface coating solution and dried as described previously in Examples 3-9. The resulting adsorbent was in powder form and free of extrusion and free of acid activation and free of residual acid (acid-free).

Examples 3-12 were prepared at varying amount of the mercapto silane and quaternary amine loading levels to study the impact on PFAS removal. As shown in Table 5, the surface area measurement of the product comprising dual surface functionalized natural attapulgite (Examples 4-12) indicates that surface coating reduces the surface area of the attapulgite utilized as feed material.

TABLE 5

Dual Surface functionalized natural attapulgite prepared at different mercapto silane and quaternary amine loading levels.

| Example | Surface area (m²/g) |
|---|---|
| Feed Material | 141 |
| Example 4 | 130 |
| Example 5 | 120 |
| Example 6 | 98 |
| Example 7 | 64 |
| Example 8 | 60 |
| Example 9 | 51 |
| Example 10 | 127 |
| Example 11 | 94 |
| Example 12 | 61 |

Figure 3:
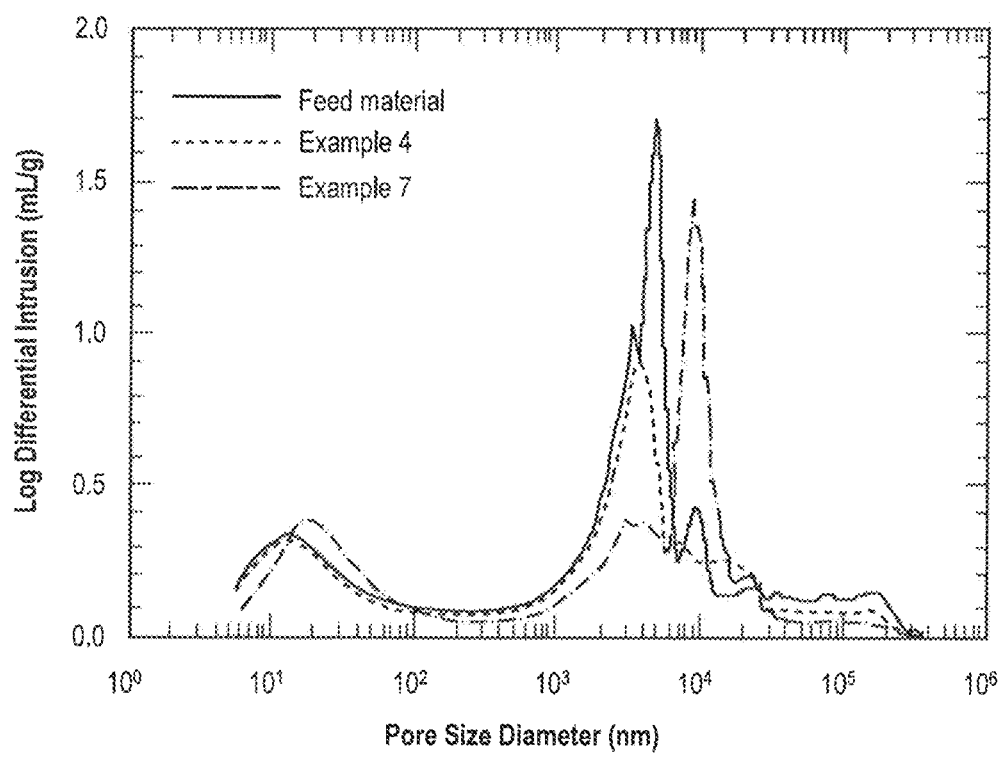
FIG. 3 illustrates the pore size distribution of the feed material and surface functionalized samples of Examples 4 and 7 (as measured by mercury intrusion).

FIG. 3 shows the pore size distribution of the feed material and of the surface functionalized samples of Examples 4 and 7 (as measured by mercury intrusion). FIG. 3 shows (for the feed material and Examples 4 and 7) the peak position of the small intrinsic pores was about 10 nm to about 25 nm, and the peak position of the large inter pores was about 2.5 microns to about 11 microns. As used herein, an "intrinsic pore" is a pore that is (a) disposed in the surface of a particle of attapulgite or (b) disposed in the structure of a particle of attapulgite. As used herein, an "inter pore" is a pore that is disposed between particles of attapulgite. As shown in Table 4, surface functionalization slightly decreases pore volume and porosity. Table 4 also shows the particle size measured by a laser particle size analyzer may increase slightly after surface functionalization with mercapto silane. The high surface area and unique interporous structure of the feed material, which comprises natural attapulgite, contribute to the resulting products effectiveness as adsorbents for various applications including PFAS adsorption.

PFAS Adsorption-Test

The products disclosed herein may each be used to adsorb PFAS in a liquid. For the PFAS adsorption test for each of the feed material and the adsorbents of Examples 1-3, influent PFAS solutions were prepared by spiking 20 parts per billion (ppb) PFAS standard solution containing 35 PFAS substances into DI water to make PFAS concentrations around 40 parts per trillion (ppt). For the PFAS adsorption test for each the adsorbents of Examples 4-12, influent PFAS solutions were prepared by spiking 20 parts per billion (ppb) PFAS standard solution containing 35 PFAS substances into DI water to make PFAS concentrations around 80 parts per trillion (ppt). Actual PFAS concentrations were measured using liquid chromatography-mass spectrometry (LC-MS) according to standard EPA Method 533 (Determination of Per- and Polyfluoroalkyl Substances in Drinking Water by Isotope Dilution Anion Exchange Solid Phase Extraction and Liquid Chromatography/Tandem Mass Spectrometry).

For the PFAS adsorption test for each of Examples 1-12, 300 mg of the respective adsorbent (Examples 1-12) was mixed with 250 ml of the prepared PFA solution on a shaker for 18 hours at room temperature. After the adsorption test, the adsorbent was separated from the liquid using EPA standard solid-phase extraction (SPE) method SW846 (test methods for evaluating solid waste, physical/chemical methods). PFAS concentration of the filtrate was measured using LC-MC based on EPA Method 533.

Individual PFAS removal efficiency was calculated as follows:

$$\frac{\text{(Influent concentration of } ind\ PFAS\ subst - }{\text{Influent concentration of individual } PFAS \text{ substance}} \times 100$$

Total PFAS removal efficiency was calculated as follows:

$$\frac{\text{(Influent concentration of total } PFAS\ subst - }{\text{Influent concentration of total } PFAS \text{ substances}} \times 100$$

Figure 4:
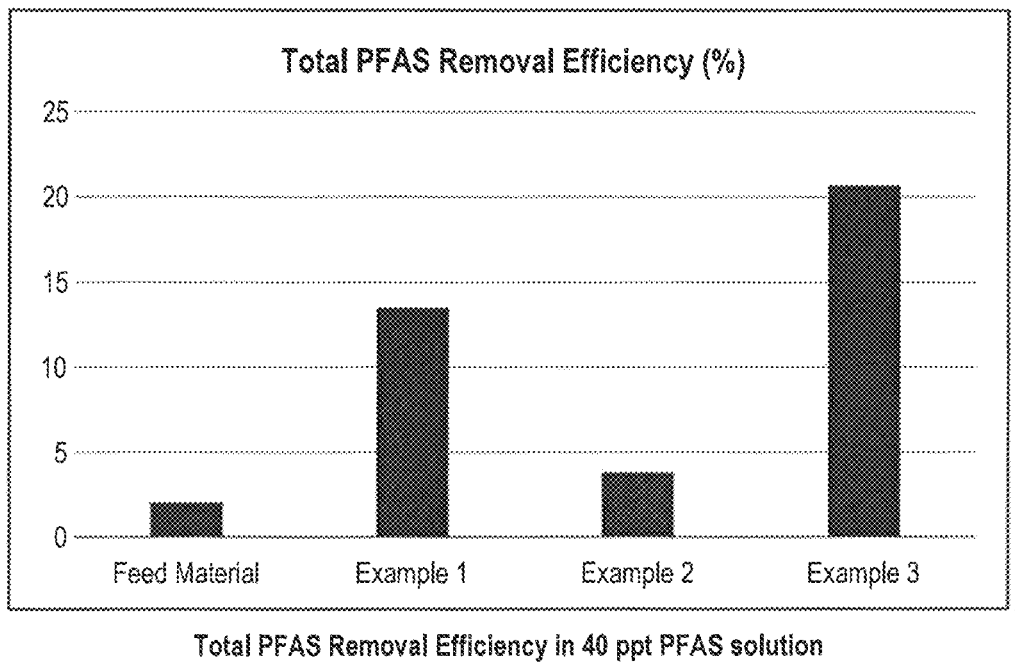
FIG. 4 is a graph illustrating the total PFAS removal efficiency in a solution containing 40 ppt PFAS.

The results of the PFAS adsorption test using a prepared solution with PFAS concentration at 40 ppt are shown in Tables 6 and 7. FIG. 4 (or Table 8) shows that total PFAS removal efficiency is significantly increased with the mercapto surface coating solution treated sample of Example 1 as compared to the untreated natural attapulgite feed material and the quaternary amine surface coating solution (containing mono-quaternary amine compound) treated sample of Example 2. Surface treatment with both mercapto surface coating solution (e.g., mercapto silane and ethanol) and the quaternary amine surface coating solution (containing mono-quaternary amine compound and DI water) (Example 3) unexpectedly further increases total PFAS removal. This may be due to the interaction of these two functional groups (mercapto functional groups and mono-quaternary amine compound functional groups) to enhance PFAS affinity to the attapulgite surface.

Figure 5:
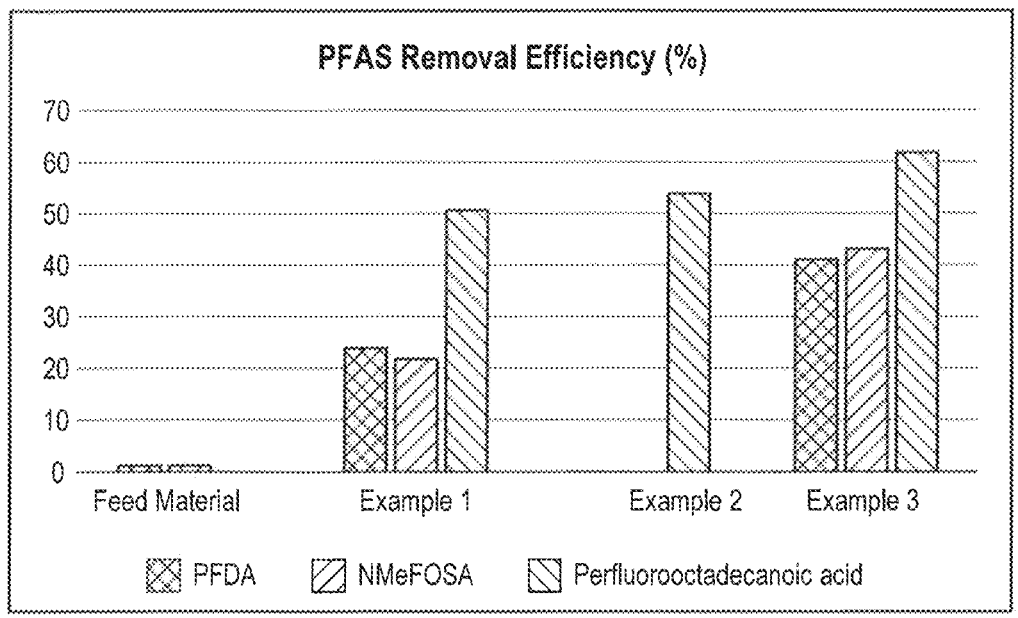
FIG. 5 is a graph illustrating the impact of mercapto surface coating solution and quaternary amine surface coating solution treatments on removal of selected PFAS substances in a solution containing 40 ppt PFAS.

FIG. 5 shows impact of surface functionalization treatment of the attapulgite feed material with the mercapto surface coating solution of Example 1 (see Tables 3A, 313 and 6), the quaternary amine surface coating solution treatment of Example 2 (see Tables 3A, 3B and 6) and the dual surface functionalization treatment of quaternary amine surface coating solution and mercapto surface coating solution of Example 3 (see Tables 3A, 3B and 7) on selected PFAS substances removal in 40 ppt synthetic PFAS starting solution. Similar to total PFAS removal, treatment with both the mercapto surface coating solution (comprising mercapto silane and ethanol) and the quaternary amine surface coating solution (comprising mono-quaternary amine compound and DI water) of Example 3 enhances removal on these selected PFAS substances as compared to the mercapto surface coating solution (Example 1) treatment alone and quaternary amine surface coating solution (Example 2) treatment alone.

TABLE 6

PFAS adsorption using feed material and Examples 1 and 2 as adsorbents.

| Fluorinated Alkyl Substances (PFAS) | Influent (ppt) | Effluent (ppt) Feed Material | Removal Efficiency (%) | Effluent (ppt) Example 1 | Removal Efficiency (%) | Effluent (ppt) Example 2 | Removal Efficiency (%) |
|---|---|---|---|---|---|---|---|
| Perfluorobutanoic acid (PFBA) | 37.68 | 39.9 | −6 | 39.3 | −4 | 40.7 | −8 |
| Perfluoropentanoic acid (PFPeA) | 38.83 | 40.4 | −4 | 41.0 | −6 | 42.1 | −8 |
| Perfluorohexanoic acid (PFHxA) | 39.41 | 41.4 | −5 | 42.6 | −8 | 44.0 | −12 |
| Perfluoroheptanoic acid (PFHpA) | 41.05 | 41.2 | 0 | 41.3 | −1 | 44.0 | −7 |
| Perfluorooctanoic acid (PFOA) | 39.73 | 44.3 | −12 | 42.3 | −6 | 45.6 | −15 |
| Perfluorononanoic acid (PFNA) | 40.73 | 44.0 | −8 | 35.1 | 14 | 44.6 | −10 |
| Perfluorodecanoic acid (PFDA) | 40.57 | 40.3 | 1 | 30.9 | 24 | 41.6 | −3 |
| Perfluoroundecanoic acid (PFUnA) | 41.52 | 42.7 | −3 | 27.2 | 34 | 44.9 | −8 |
| Perfluorododecanoic acid (PFDoA) | 40.28 | 40.5 | −1 | 27.6 | 31 | 43.2 | −7 |
| Perfluorotridecanoic acid (PFTriA) | 35.82 | 35.0 | 2 | 32.3 | 10 | 27.6 | 23 |

TABLE 6-continued

PFAS adsorption using feed material and Examples 1 and 2 as adsorbents.

| Fluorinated Alkyl Substances (PFAS) | Influent (ppt) | Effluent (ppt) Feed Material | Removal Efficiency (%) | Effluent (ppt) Example 1 | Removal Efficiency (%) | Effluent (ppt) Example 2 | Removal Efficiency (%) |
|---|---|---|---|---|---|---|---|
| Perfluorotetradecanoic acid (PFTeA) | 39.24 | 29.2 | 26 | 34.7 | 12 | 32.3 | 18 |
| Perfluorohexadecanoic acid | 40.24 | 29.9 | 26 | 43.7 | −9 | 33.9 | 16 |
| Perfluorooctadecanoic acid | 48.79 | 49.6 | −2 | 24.0 | 51 | 22.3 | 54 |
| Perfluorobutanesulfonic acid (PFBS) | 34.45 | 36.8 | −7 | 37.7 | −9 | 38.3 | −11 |
| Perfluoropentanesulfonic acid (PFPeS) | 37.5 | 46.8 | −25 | 37.0 | 1 | 41.5 | −11 |
| Perfluorohexanesulfonic acid (PFHxS) | 34.26 | 36.5 | −7 | 34.1 | 0 | 39.9 | −16 |
| Perfluoroheptanesulfonic Acid (PFHpS) | 39.67 | 41.5 | −5 | 42.8 | −8 | 51.2 | −29 |
| Perfluorooctanesulfonic acid (PFOS) | 38.86 | 41.0 | −6 | 30.9 | 20 | 43.4 | −12 |
| Perfluorononanesulfonic acid (PFNS) | 41.74 | 39.3 | 6 | 29.0 | 31 | 31.4 | 25 |
| Perfluorodecanesulfonic acid (PFDS) | 38.87 | 18.6 | 52 | 30.1 | 23 | 18.2 | 53 |
| Perfluorododecanesulfonic acid (PFDoS) | 31.02 | 20.7 | 33 | 35.0 | −13 | 9.8 | 69 |
| Perfluorooctanesulfonamide (FOSA) | 37.34 | 38.8 | −4 | 31.5 | 16 | 39.6 | −6 |
| N-ethylperfluoro-1-octanesulfonamide | 44.55 | 39.1 | 12 | 29.2 | 34 | 43.8 | 2 |
| NMeFOSA | 43.02 | 42.7 | 1 | 33.8 | 21 | 44.7 | −4 |
| N-methylperfluorooctanesulfonamidoacetic acid (NMeFOSAA) | 37.91 | 39.8 | −5 | 26.7 | 30 | 43.9 | −16 |
| N-ethylperfluorooctanesulfonamidoacetic acid (NEtFOSAA) | 40.32 | 47.4 | −18 | 27.1 | 33 | 48.4 | −20 |
| 2-(N-methylperfluoro-1-octanesulfonamido) ethanol | 40.8 | 39.1 | 4 | 30.3 | 26 | 39.8 | 2 |
| 2-(N-ethylperfluoro-1-octanesulfonamido) ethanol | 49.97 | 47.5 | 5 | 39.0 | 22 | 32.2 | 36 |
| 4:2 FTS | 36.09 | 39.6 | −10 | 40.9 | −13 | 41.5 | −15 |
| 6:2 FTS | 35.93 | 38.8 | −8 | 37.2 | −4 | 60.9 | −69 |
| 8:2 FTS | 38.78 | 42.4 | −9 | 30.7 | 21 | 40.4 | −4 |
| 10:2 FTS | 40.53 | 32.2 | 21 | 30.9 | 24 | 15.9 | 61 |
| HFPO-DA | 41.38 | 40.4 | 2 | 44.7 | −8 | 44.8 | −8 |
| 9-Chlorohexadecafluoro-3-oxanonane-1-sulfonic acid | 40.58 | 40.5 | 0 | 25.9 | 36 | 39.3 | 3 |
| 11-Chloroeicosafluoro-3-oxaundecane-1-sulfonic acid | 38.94 | 30.2 | 22 | 32.4 | 17 | 16.7 | 57 |
| Total PFAS concentration (ppt) | 1386.4 | 1358.1 | | 1198.9 | | 1332.35 | |

TABLE 7

PFAS adsorption using Example 3 as adsorbent.

| Fluorinated Alkyl Substances (PFAS) | Influent (ppt) | Effluent (ppt) Example 3 | Removal Efficiency (%) |
|---|---|---|---|
| Perfluorobutanoic acid (PFBA) | 38.41 | 38.8 | −1 |
| Perfluoropentanoic acid (PFPeA) | 38.44 | 38.1 | 1 |
| Perfluorohexanoic acid (PFHxA) | 38.07 | 38.0 | 0 |
| Perfluoroheptanoic acid (PFHpA) | 38.1 | 41.5 | −9 |

TABLE 7-continued

PFAS adsorption using Example 3 as adsorbent.

| Fluorinated Alkyl Substances (PFAS) | Influent (ppt) | Effluent (ppt) Example 3 | Removal Efficiency (%) |
|---|---|---|---|
| Perfluorooctanoic acid (PFOA) | 40.5 | 38.8 | 4 |
| Perfluorononanoic acid (PFNA) | 39.17 | 30.8 | 21 |
| Perfluorodecanoic acid (PFDA) | 38.67 | 22.7 | 41 |
| Perfluoroundecanoic acid (PFUnA) | 37.75 | 24.4 | 35 |
| Perfluorododecanoic acid (PFDoA) | 38.7 | 28.2 | 27 |
| Perfluorotridecanoic acid (PFTriA) | 30.88 | 26.7 | 14 |
| Perfluorotetradecanoic acid (PFTeA) | 41.81 | 28.2 | 33 |
| Perfluorohexadecanoic acid | 40.44 | 54.0 | −34 |
| Perfluorooctadecanoic acid | 43.57 | 16.6 | 62 |
| Perfluorobutanesulfonic acid (PFBS) | 33.16 | 34.5 | −4 |
| Perfluoropentanesulfonic acid (PFPeS) | 35.79 | 38.3 | −7 |
| Perfluorohexanesulfonic acid (PFHxS) | 33.73 | 34.0 | −1 |
| Perfluoroheptanesulfonic Acid (PFHpS) | 37.29 | 26.7 | 28 |
| Perfluorooctanesulfonic acid (PFOS) | 35.59 | 20.9 | 41 |
| Perfluorononanesulfonic acid (PFNS) | 37.03 | 22.8 | 38 |
| Perfluorodecanesulfonic acid (PFDS) | 37.29 | 16.4 | 56 |
| Perfluorododecanesulfonic acid (PFDoS) | 26.87 | 20.5 | 24 |
| Perfluorooctanesulfonamide (FOSA) | 37.85 | 26.8 | 29 |
| N-ethylperfluoro-1-octanesulfonamide | 40.91 | 23.3 | 43 |
| NMeFOSA | 41.54 | 23.6 | 43 |
| N-methylperfluorooctanesulfonamidoacetic acid (NMeFOSAA) | 40.29 | 24.5 | 39 |
| N-ethylperfluorooctanesulfonamide ethylperfluorooctanesulfonamidoacetic acid (NEtFOSAA) | 38.69 | 25.2 | 35 |
| 2-(N-methylperfluoro-1-octanesulfonamido) ethanol | 40.52 | 32.7 | 19 |
| 2-(N-ethylperfluoro-1-octanesulfonamido) ethanol | 36.37 | 29.2 | 20 |
| 4:2 FTS | 38.83 | 39.6 | −2 |
| 6:2 FTS | 36.49 | 39.9 | −9 |
| 8:2 FTS | 34.54 | 24.0 | 31 |
| 10:2 FTS | 33.74 | 23.9 | 29 |
| HFPO-DA | 41.59 | 39.6 | 5 |
| 9-Chlorohexadecafluoro-3-oxanonane-1-sulfonic acid | 35.89 | 23.2 | 35 |
| 11-Chloroeicosafluoro-3-oxaundecane-1-sulfonic acid | 33.71 | 24.5 | 27 |
| Total PFAS concentration (ppt) | 1312.22 | 1040.9 | |

Table 8 shows a comparison of total PFAS removal efficiency in 40 ppt PFAS solution for the untreated attapulgite feed material and Examples 1-3 prepared from the feed material, using surface functionalization treatment. Similar to Tables 3A-3B, in Table 8, the weight percentage of surface coating agent (e.g., mercapto silane) is determined as a percentage of the weight of the resulting adsorbent and the weight percentage of quaternary amine is determined as a weight percentage of the resulting adsorbent. It is unexpected that combination of quaternary amine and mercapto silane surface coating on attapulgite enhances PFAS adsorption compared to quaternary amine alone or mercapto silane surface coating on attapulgite.

TABLE 8

Total PFAS Removal Efficiency in 40 ppt PFAS Solution.

| | Target PFAS Concentration (ppt) | Mercapto Silane (wt. %) | Quaternary Amine (wt. %) | Mercapto Silane + Quaternary Amine (wt. %) | Influent Total PFAS Concentration (ppt) | Effluent Total PFAS Concentration (ppt) | Total PFAS Removal Efficiency (%) |
|---|---|---|---|---|---|---|---|
| Feed Matl | 40 | 0 | 0 | 0 | 1386.40 | 1358.1 | 2 |
| Ex 1 | 40 | 5.0 | 0 | 5 | 1386.40 | 1198.9 | 14 |
| Ex 2 | 40 | 0 | 5.3 | 5.3 | 1386.40 | 1332.4 | 4 |
| Ex 3 | 40 | 4.7 | 5 | 9.8 | 1312.22 | 1040.9 | 21 |

Figure 6:
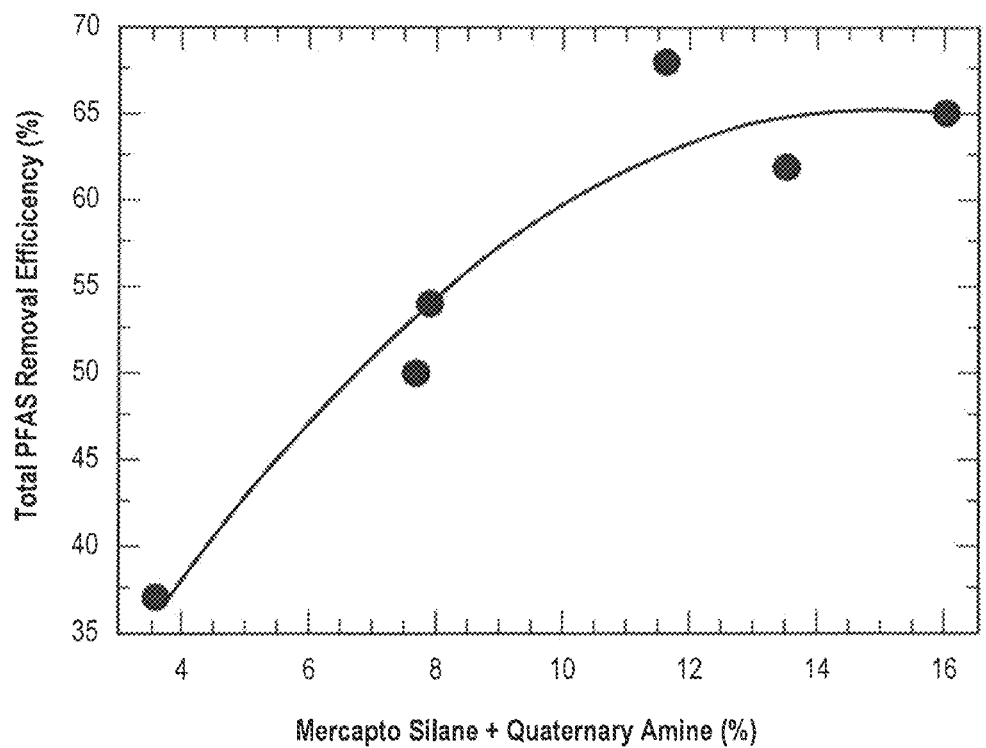
FIG. 6 is a graph showing the impact of mercapto silane and quaternary amine loading (Examples 4-9) on total PFAS removal efficiency in a solution of 80 ppt PFAS.
Figure 7:
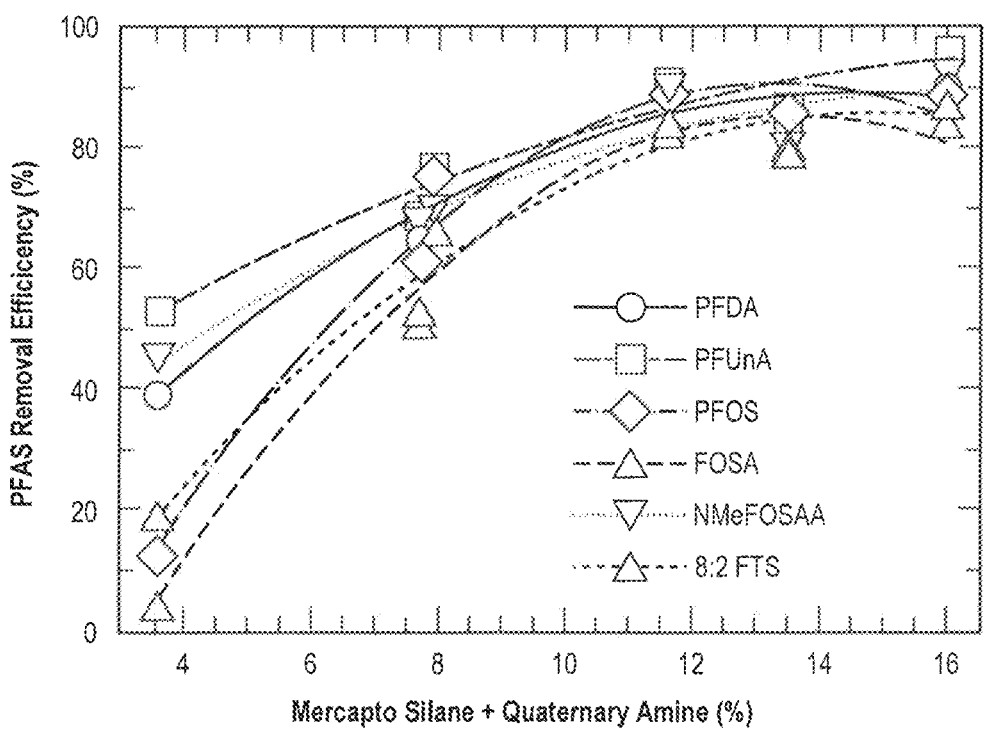
FIG. 7 is a graph showing the impact of attapulgite surface functionalized with mercapto silane and quaternary amine on PFAS removal efficiency for selected PFAS substances.

Tables 9 & 10 show the results of the PFAS adsorption test in a prepared solution with PFAS concentration at 80 ppt using Examples 4-9 (the samples treated with both mercapto surface coating solution (comprising mercapto silane and ethanol) and quaternary amine surface coating solution (comprising quaternary amine compound and DI water)). FIG. 6 shows total PFAS removal efficiency increases with increasing total mercapto silane and quaternary amine loading level. A similar trend is also observed for the selected PFAS substances (FIG. 7).

Figure 8:
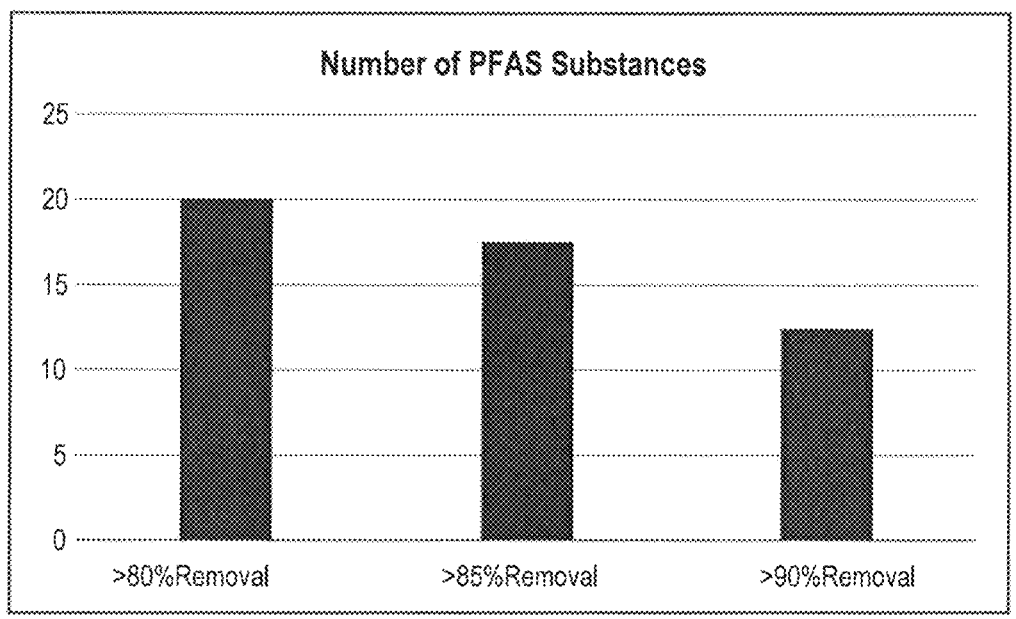
FIG. 8 is a graph showing the quantity of PFAS substances (out of a total of 35 PFAS substances) that had a removal efficiency of greater than or equal to 80%, greater than or equal to 85%, or greater than or equal to 90% for Example 8.

FIG. 8 shows, among 35 PFAS substances, greater than or equal to 80% removal was achieved on 20 PFAS substances, greater than or equal to 85% removal was achieved on 18 PFAS substances and greater than or equal to 90% removal was achieved on 12 PFAS substances for Example 8.

TABLE 9

PFAS adsorption using Examples 4-6 as adsorbents.

| Fluorinated Alkyl Substances (PFAS) | Influent (ppt) | Effluent (ppt) Example 4 | Removal Efficiency (%) of Example 4 | Effluent (ppt) Example 5 | Removal Efficiency (%) of Example 5 | Effluent (ppt) Example 6 | Removal Efficiency (%) of Example 6 |
|---|---|---|---|---|---|---|---|
| Perfluorobutanoic acid (PFBA) | 79.46 | 78.3 | 1 | 73.2 | 8 | 75.2 | 5 |
| Perfluoropentanoic acid (PFPeA) | 78.38 | 76.1 | 3 | 72.7 | 7 | 77.5 | 1 |
| Perfluorohexanoic acid (PFHxA) | 82.08 | 75.2 | 8 | 76.5 | 7 | 78.1 | 5 |
| Perfluoroheptanoic acid (PFHpA) | 74.72 | 77.8 | −4 | 63.9 | 14 | 71.5 | 4 |
| Perfluorooctanoic acid (PFOA) | 80.62 | 83.1 | −3 | 47.4 | 41 | 65.8 | 18 |
| Perfluorononanoic acid (PFNA) | 78.94 | 76.3 | 3 | 21.3 | 73 | 36.2 | 54 |
| Perfluorodecanoic acid (PFDA) | 91.70 | 56.0 | 39 | 9.76 | 89 | 23.0 | 75 |
| Perfluoroundecanoic acid (PFUnA) | 79.16 | 36.9 | 53 | 7.21 | 91 | 18.1 | 77 |
| Perfluorododecanoic acid (PFDoA) | 83.5 | 17.9 | 79 | 4.79 | 94 | 15.8 | 81 |
| Perfluorotridecanoic acid (PFTriA) | 70.02 | 9.65 | 86 | 5.25 | 93 | 14.3 | 80 |
| Perfluorotetradecanoic acid (PFTeA) | 83.26 | 2.93 | 96 | 10.3 | 88 | 12.7 | 85 |
| Perfluorohexadecanoic acid | 75.28 | 1.61 | 98 | 29.4 | 61 | 32.1 | 57 |
| Perfluorooctadecanoic acid | 87.98 | 1.46 | 98 | 29.6 | 66 | 38.7 | 56 |
| Perfluorobutanesulfonic acid (PFBS) | 71.4 | 70.5 | 1 | 65.7 | 8 | 66.5 | 7 |
| Perfluoropentanesulfonic acid (PFPeS) | 80.92 | 87.9 | −9 | 65.0 | 20 | 75.4 | 7 |
| Perfluorohexanesulfonic acid (PFHxS) | 71.20 | 74.0 | −4 | 45.2 | 37 | 58.5 | 18 |
| Perfluoroheptanesulfonic Acid (PFHpS) | 82.66 | 84.3 | −2 | 21.1 | 74 | 37.5 | 55 |
| Perfluorooctanesulfonic acid (PFOS) | 73.74 | 65.0 | 12 | 8.90 | 88 | 18.4 | 75 |
| Perfluorononanesulfonic acid (PFNS) | 72.38 | 36.8 | 49 | 5.07 | 93 | 14.9 | 79 |
| Perfluorodecanesulfonic acid (PFDS) | 70.28 | 12.5 | 82 | 3.46 | 95 | 10.7 | 85 |
| Perfluorododecanesulfonic acid (PFDoS) | 58.54 | 1.83 | 97 | 3.04 | 95 | 8.51 | 85 |
| Perfluorooctanesulfonamide (FOSA) | 81.32 | 77.8 | 4 | 14.1 | 83 | 25.6 | 69 |

TABLE 9-continued

PFAS adsorption using Examples 4-6 as adsorbents.

| Fluorinated Alkyl Substances (PFAS) | Influent (ppt) | Effluent (ppt) Example 4 | Removal Efficiency (%) of Example 4 | Effluent (ppt) Example 5 | Removal Efficiency (%) of Example 5 | Effluent (ppt) Example 6 | Removal Efficiency (%) of Example 6 |
|---|---|---|---|---|---|---|---|
| N-ethylperfluoro-1-octanesulfonamide | 82.24 | 51.9 | 37 | 5.19 | 94 | 8.08 | 90 |
| NMeFOSA | 75.36 | 57.5 | 24 | 6.48 | 91 | 10.5 | 86 |
| N-methylperfluorooctanesulfonamidoacetic acid (NMeFOSAA) | 73.36 | 40.2 | 45 | 8.13 | 89 | 22.0 | 70 |
| N-ethylperfluorooctanesulfonamidoacetic acid (NEtFOSAA) | 74.32 | 36.5 | 51 | 4.10 | 94 | 17.5 | 76 |
| 2-(N-methylperfluoro-1-octanesulfonamido) ethanol | 78.24 | 20.2 | 74 | 14.4 | 82 | 19.6 | 75 |
| 2-(N-ethylperfluoro-1-octanesulfonamido) ethanol | 83.60 | 8.76 | 90 | 9.51 | 89 | 13.4 | 84 |
| 4:2 FTS | 73.14 | 71.3 | 3 | 71.2 | 3 | 70.3 | 4 |
| 6:2 FTS | 70.42 | 75.8 | −8 | 43.6 | 38 | 64.6 | 8 |
| 8:2 FTS | 65.07 | 53.4 | 19 | 10.5 | 84 | 21.6 | 67 |
| 10:2 FTS | 83.86 | 16.2 | 81 | 4.01 | 95 | 14.9 | 82 |
| HFPO-DA | 86.32 | 81.4 | 6 | 84.4 | 2 | 78.2 | 9 |
| 9-Chlorohexadecafluoro-3-oxanonane-1-sulfonic acid | 75.66 | 58.1 | 23 | 4.69 | 94 | 10.4 | 86 |
| 11-Chloroeicosafluoro-3-oxaundecane-1-sulfonic acid | 64.12 | 10.9 | 83 | 2.86 | 96 | 8.65 | 87 |
| Total PFAS concentration (ppt) | 2693.88 | 1686.04 | | 1359.79 | | 1234.74 | |

TABLE 10

PFAS adsorption using Examples 7-9 as adsorbents.

| Fluorinated Alkyl Substances (PFAS) | Influent (ppt) | Effluent (ppt) Example 7 | Removal Efficiency (%) of Example 7 | Effluent (ppt) Example 8 | Removal Efficiency (%) of Example 8 | Effluent (ppt) Example 9 | Removal Efficiency (%) of Example 9 |
|---|---|---|---|---|---|---|---|
| Perfluorobutanoic acid (PFBA) | 79.46 | 72.0 | 9 | 73.2 | 8 | 75.4 | 5 |
| Perfluoropentanoic acid (PFPeA) | 78.38 | 71.8 | 8 | 72.7 | 7 | 75.5 | 4 |
| Perfluorohexanoic acid (PFHxA) | 82.08 | 70.5 | 14 | 76.5 | 7 | 70.7 | 14 |
| Perfluoroheptanoic acid (PFHpA) | 74.72 | 63.9 | 14 | 63.9 | 14 | 67.2 | 10 |
| Perfluorooctanoic acid (PFOA) | 80.62 | 55.9 | 31 | 47.4 | 41 | 55.1 | 32 |
| Perfluorononanoic acid (PFNA) | 78.94 | 25.9 | 67 | 21.3 | 73 | 28.3 | 64 |
| Perfluorodecanoic acid (PFDA) | 91.70 | 15.0 | 84 | 9.76 | 89 | 8.93 | 90 |
| Perfluoroundecanoic acid (PFUnA) | 79.16 | 10.6 | 87 | 7.21 | 91 | 3.49 | 96 |
| Perfluorododecanoic acid (PFDoA) | 83.5 | 8.27 | 90 | 4.79 | 94 | 2.01 | 98 |
| Perfluorotridecanoic acid (PFTriA) | 70.02 | 7.88 | 89 | 5.25 | 93 | 2.65 | 96 |
| Perfluorotetradecanoic acid (PFTeA) | 83.26 | 19.9 | 76 | 10.3 | 88 | 6.29 | 92 |
| Perfluorohexadecanoic acid | 75.28 | 32.6 | 57 | 29.4 | 61 | 21.6 | 71 |

TABLE 10-continued

PFAS adsorption using Examples 7-9 as adsorbents.

| Fluorinated Alkyl Substances (PFAS) | Influent (ppt) | Effluent (ppt) Example 7 | Removal Efficiency (%) of Example 7 | Effluent (ppt) Example 8 | Removal Efficiency (%) of Example 8 | Effluent (ppt) Example 9 | Removal Efficiency (%) of Example 9 |
|---|---|---|---|---|---|---|---|
| Perfluorooctadecanoic acid | 87.98 | 33.8 | 62 | 29.6 | 66 | 32.4 | 63 |
| Perfluorobutanesulfonic acid (PFBS) | 71.4 | 60.2 | 16 | 65.7 | 8 | 63.0 | 12 |
| Perfluoropentanesulfonic acid (PFPeS) | 80.92 | 59.2 | 27 | 65.0 | 20 | 59.5 | 26 |
| Perfluorohexanesulfonic acid (PFHxS) | 71.20 | 44.3 | 38 | 45.2 | 37 | 47.1 | 34 |
| Perfluoroheptanesulfonic Acid (PFHpS) | 82.66 | 23.8 | 71 | 21.1 | 74 | 26.0 | 69 |
| Perfluorooctanesulfonic acid (PFOS) | 73.74 | 11.1 | 85 | 8.90 | 88 | 8.58 | 88 |
| Perfluorononanesulfonic acid (PFNS) | 72.38 | 9.39 | 87 | 5.07 | 93 | 3.25 | 96 |
| Perfluorodecanesulfonic acid (PFDS) | 70.28 | 6.56 | 91 | 3.46 | 95 | 1.87 | 97 |
| Perfluorododecanesulfonic acid (PFDoS) | 58.54 | 5.86 | 90 | 3.04 | 95 | 3.53 | 94 |
| Perfluorooctanesulfonamide (FOSA) | 81.32 | 16.2 | 80 | 14.1 | 83 | 13.3 | 84 |
| N-ethylperfluoro-1-octanesulfonamide | 82.24 | 3.97 | 95 | 5.19 | 94 | 5.49 | 93 |
| NMeFOSA | 75.36 | 4.82 | 94 | 6.48 | 91 | 6.29 | 92 |
| N-methylperfluorooctanesulfonamidoacetic acid (NMeFOSAA) | 73.36 | 15.0 | 80 | 8.13 | 89 | 5.59 | 92 |
| N-ethylperfluorooctanesulfonamidoacetic acid (NEtFOSAA) | 74.32 | 9.34 | 87 | 4.10 | 94 | 2.99 | 96 |
| 2-(N-methylperfluoro-1-octanesulfonamido)ethanol | 78.24 | 16.2 | 79 | 14.4 | 82 | 19.4 | 75 |
| 2-(N-ethylperfluoro-1-octanesulfonamido)ethanol | 83.60 | 9.67 | 88 | 9.51 | 89 | 10.6 | 87 |
| 4:2 FTS | 73.14 | 67.7 | 7 | 71.2 | 3 | 68.3 | 7 |
| 6:2 FTS | 70.42 | 46.9 | 33 | 43.6 | 38 | 49.3 | 30 |
| 8:2 FTS | 65.07 | 13.8 | 79 | 10.5 | 84 | 8.38 | 87 |
| 10:2 FTS | 83.86 | 7.63 | 91 | 4.01 | 95 | 1.66 | 98 |
| HFPO-DA | 86.32 | 80.5 | 7 | 84.4 | 2 | 73.8 | 15 |
| 9-Chlorohexadecafluoro-3-oxanonane-1-sulfonic acid | 75.66 | 6.16 | 92 | 4.69 | 94 | 4.00 | 95 |
| 11-Chloroeicosafluoro-3-oxaundecane-1-sulfonic acid | 64.12 | 5.07 | 92 | 2.86 | 96 | 1.85 | 97 |
| Total PFAS concentration (ppt) | 2693.88 | 1011.42 | | 867.95 | | 933.35 | |

Table 11 shows a comparison of total PFAS removal efficiency in 80 ppt PFAS solution for Examples 4-9 prepared from the feed material, using surface functionalization treatment. Similar to Tables 3B and 8, the weight percentage of surface coating agent (e.g., mercapto silane) is determined as a percentage of the weight of the resulting adsorbent and the percentage of quaternary amine is determined as a weight percentage of the resulting adsorbent.

TABLE 11

Total PFAS Removal Efficiency in 80 ppt PFAS solution.

| | Target PFAS Concentration (ppt) | Mercapto Silane (wt. %) | Quaternary Amine (%) | Mercapto Silane + Quaternary Amine (wt. %) | Influent Total PFAS Concentration (ppt) | Effluent Total PFAS Concentration (ppt) | Total PFAS Removal Efficiency (%) |
|---|---|---|---|---|---|---|---|
| Example 4 | 80 | 1.0 | 2.6 | 3.6 | 2693.88 | 1686.04 | 37 |
| Example 5 | 80 | 5.1 | 2.6 | 7.7 | 2693.88 | 1359.79 | 50 |
| Example 6 | 80 | 3.1 | 4.7 | 7.9 | 2693.88 | 1234.74 | 54 |
| Example 7 | 80 | 5.4 | 8.1 | 13.5 | 2693.88 | 1011.42 | 62 |
| Example 8 | 80 | 1.1 | 10.5 | 11.6 | 2693.88 | 867.95 | 68 |
| Example 9 | 80 | 5.5 | 10.5 | 16.0 | 2693.88 | 933.35 | 65 |

Figure 9:
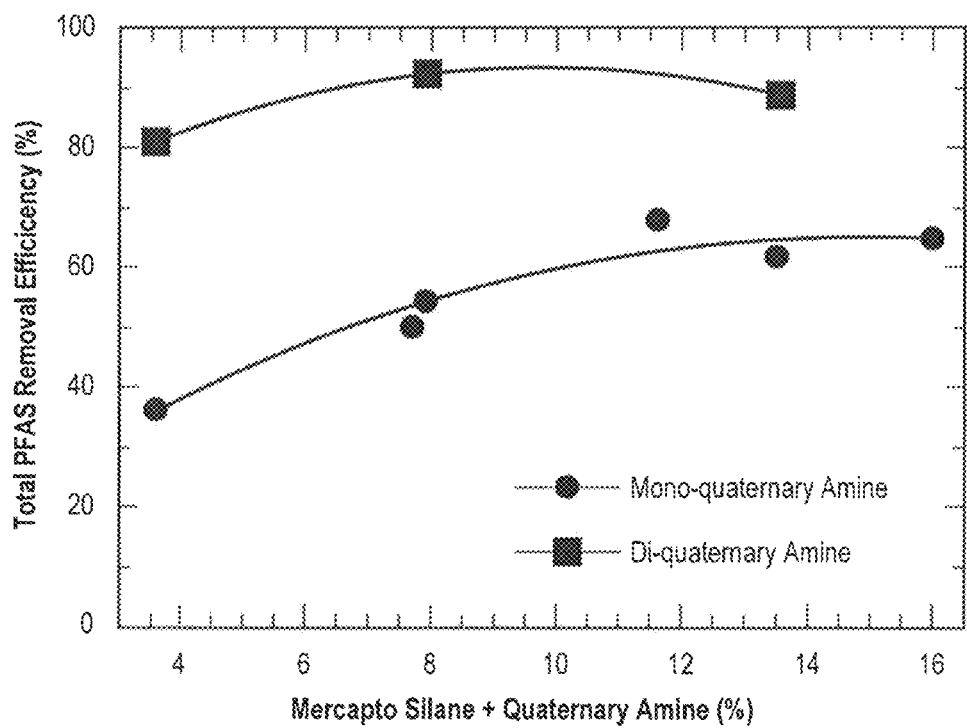
FIG. 9 is a graph showing the impact of mercapto silane and quaternary amine loading (Examples 4-12) on total PFAS removal efficiency in a solution of 80 ppt PFAS.

Table 12 shows a comparison of total PFAS removal efficiency in 80 ppt PFAS solution for Examples 10-12 prepared from the feed material, using surface functionalization treatment. Similar to Tables 3B and 8, the weight percentage of surface coating agent (e.g., mercapto silane) is determined as a percentage of the weight of the resulting adsorbent and the percentage of quaternary amine is determined as a weight percentage of the resulting adsorbent. FIG. 9 shows total PFAS removal efficiency increases with increasing total mercapto silane and quaternary amine loading level.

TABLE 12

PFAS adsorption using Examples 10-12 as adsorbents.

| Fluorinated Alkyl Substances (PFAS) | Influent (ppt) | Effluent (ppt) Example 10 | Removal Efficiency (%) of Example 10 | Effluent (ppt) Example 11 | Removal Efficiency (%) of Example 11 | Effluent (ppt) Example 12 | Removal Efficiency (%) of Example 12 |
|---|---|---|---|---|---|---|---|
| Perfluorobutanoic acid (PFBA) | 79.88 | 80.9 | −1.3 | 58.7 | 26.5 | 42.7 | 46.5 |
| Perfluoropentanoic acid (PFPeA) | 78.34 | 77.3 | 1.3 | 35.1 | 55.2 | 23.2 | 70.4 |
| Perfluorohexanoic acid (PFHxA) | 72.44 | 60.9 | 15.9 | 13.4 | 81.5 | 10.2 | 85.9 |
| Perfluoroheptanoic acid (PFHpA) | 83.94 | 48.0 | 42.8 | 5.10 | 93.9 | 7.48 | 91.1 |
| Perfluorooctanoic acid (PFOA) | 80.08 | 19.9 | 75.1 | 2.53 | 96.8 | 6.28 | 92.2 |
| Perfluorononanoic acid (PFNA) | 86.08 | 6.78 | 92.1 | 2.00 | 97.7 | 6.27 | 92.7 |
| Perfluorodecanoic acid (PFDA) | 76.68 | 2.35 | 96.9 | 3.33 | 95.7 | 6.88 | 91.0 |
| Perfluoroundecanoic acid (PFUnA) | 87.06 | 1.06 | 98.8 | 3.01 | 96.5 | 10.7 | 87.7 |
| Perfluorododecanoic acid (PFDoA) | 83.34 | 0.828 | 99.0 | 2.92 | 96.5 | 11.3 | 86.4 |
| Perfluorotridecanoic acid (PFTriA) | 72.72 | 0.917 | 98.7 | 1.91 | 97.4 | 14.8 | 79.6 |
| Perfluorotetradecanoic acid (PFTeA) | 78.98 | 0.749 | 99.1 | 2.04 | 97.4 | 12.4 | 84.3 |
| Perfluorohexadecanoic acid | 85.98 | 0.765 | 99.1 | 1.78 | 97.9 | 9.19 | 89.3 |
| Perfluorooctadecanoic acid | 87.06 | 0.885 | 99.0 | 2.06 | 97.6 | 9.40 | 89.2 |
| Perfluorobutanesulfonic acid (PFBS) | 80.54 | 26.3 | 67.3 | 2.35 | 97.1 | 3.21 | 96.0 |
| Perfluoropentanesulfonic acid (PFPeS) | 89.84 | 10.9 | 87.9 | 1.05 | 98.8 | 3.09 | 96.6 |
| Perfluorohexanesulfonic acid (PFHxS) | 77.7 | 4.09 | 94.7 | 1.42 | 98.2 | 2.64 | 96.6 |
| Perfluoroheptanesulfonic Acid (PFHpS) | 77.86 | 1.59 | 98.0 | 2.52 | 96.8 | 5.46 | 93.0 |
| Perfluorooctanesulfonic acid (PFOS) | 73.46 | 1.00 | 98.6 | 1.77 | 97.6 | 4.30 | 94.1 |
| Perfluorononanesulfonic acid (PFNS) | 67.46 | 0.628 | 99.1 | 2.23 | 96.7 | 4.50 | 93.3 |

TABLE 12-continued

PFAS adsorption using Examples 10-12 as adsorbents.

| Fluorinated Alkyl Substances (PFAS) | Influent (ppt) | Effluent (ppt) Example 10 | Removal Efficiency (%) of Example 10 | Effluent (ppt) Example 11 | Removal Efficiency (%) of Example 11 | Effluent (ppt) Example 12 | Removal Efficiency (%) of Example 12 |
|---|---|---|---|---|---|---|---|
| Perfluorodecanesulfonic acid (PFDS) | 75.54 | 0.356 | 99.5 | 0.955 | 98.7 | 2.63 | 96.5 |
| Perfluorododecanesulfonic acid (PFDoS) | 59.64 | 0.490 | 99.2 | 0.515 | 99.1 | 1.42 | 97.6 |
| Perfluorooctanesulfonamide (FOSA) | 79.34 | 3.63 | 95.4 | 3.06 | 96.1 | 7.13 | 91.0 |
| N-ethylperfluoro-1-octanesulfonamide | 73.66 | 1.94 | 97.4 | 2.44 | 96.7 | 7.14 | 90.3 |
| NMeFOSA | 83.42 | 1.10 | 98.7 | 2.94 | 96.5 | 5.19 | 93.8 |
| N-methylperfluorooctanesulfonamidoacetic acid (NMeFOSAA) | 76.96 | 3.58 | 95.3 | 1.37 | 98.2 | 10.9 | 85.8 |
| N-ethylperfluorooctanesulfonamidoacetic acid (NEtFOSAA) | 74.24 | 3.07 | 95.9 | 1.59 | 97.9 | 9.57 | 87.1 |
| 2-(N-methylperfluoro-1-octanesulfonamido) ethanol | 78.7 | 1.17 | 98.5 | 2.64 | 96.6 | 4.10 | 94.8 |
| 2-(N-ethylperfluoro-1-octanesulfonamido) ethanol | 80.64 | 0.937 | 98.8 | 2.09 | 97.4 | 3.26 | 96.0 |
| 4:2 FTS | 69.88 | 67.8 | 3.0 | 17.3 | 75.2 | 12.5 | 82.1 |
| 6:2 FTS | 69.8 | 24.6 | 64.8 | 2.70 | 96.1 | 4.29 | 93.9 |
| 8:2 FTS | 81.52 | 2.60 | 96.8 | 1.80 | 97.8 | 4.58 | 94.4 |
| 10:2 FTS | 76.78 | ND | 100.0 | 1.56 | 98.0 | 4.18 | 94.6 |
| HFPO-DA | 86.54 | 70.8 | 18.2 | 18.3 | 78.9 | 11.80 | 86.4 |
| 9-Chlorohexadecafluoro-3-oxanonane-1-sulfonic acid | 76.78 | 0.769 | 99.0 | 2.31 | 97.0 | 4.71 | 93.9 |
| 11-Chloroeicosafluoro-3-oxaundecane-1-sulfonic acid | 71.40 | 0.619 | 99.1 | 1.29 | 98.2 | 4.13 | 94.2 |
| Total PFAS concentration (ng/L) | 2734.28 | 529.303 | 80.6 | 208.08 | 92.4 | 291.53 | 89.3 |

Figure 10:
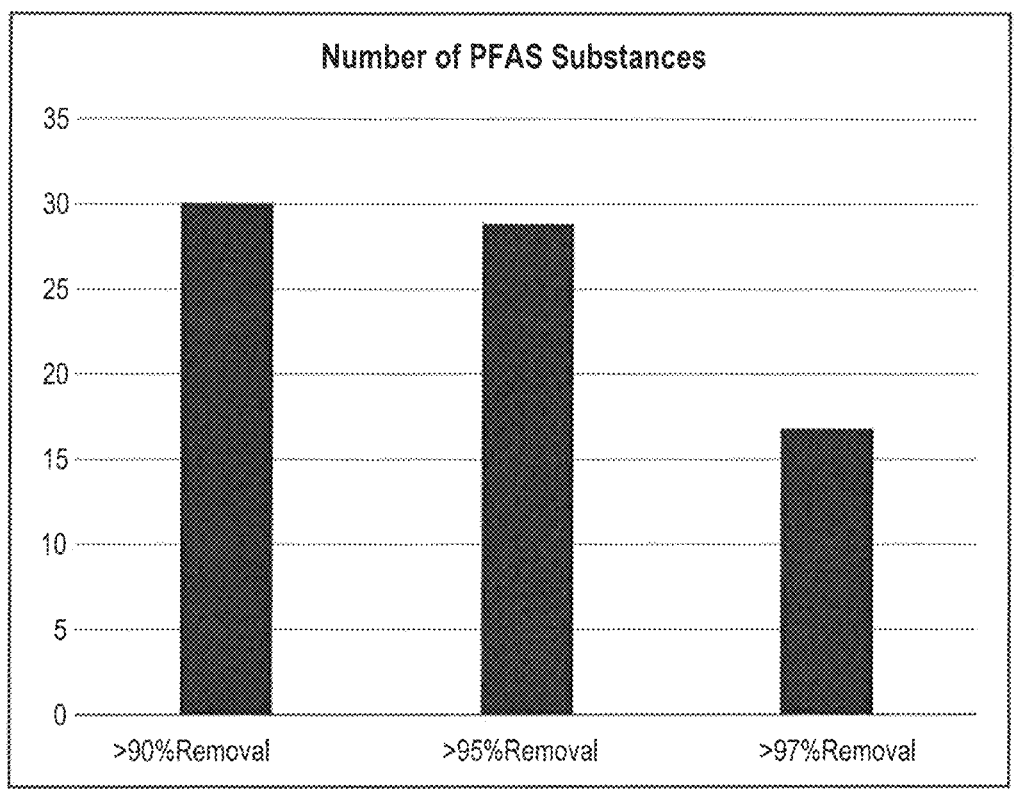
FIG. 10 is a graph showing the quantity of PFAS substances (out of a total of 35 PFAS substances) that had a removal efficiency of greater than or equal to 90%, greater than or equal to 95%, or greater than or equal to 97% for Example 11.
Figure 11:
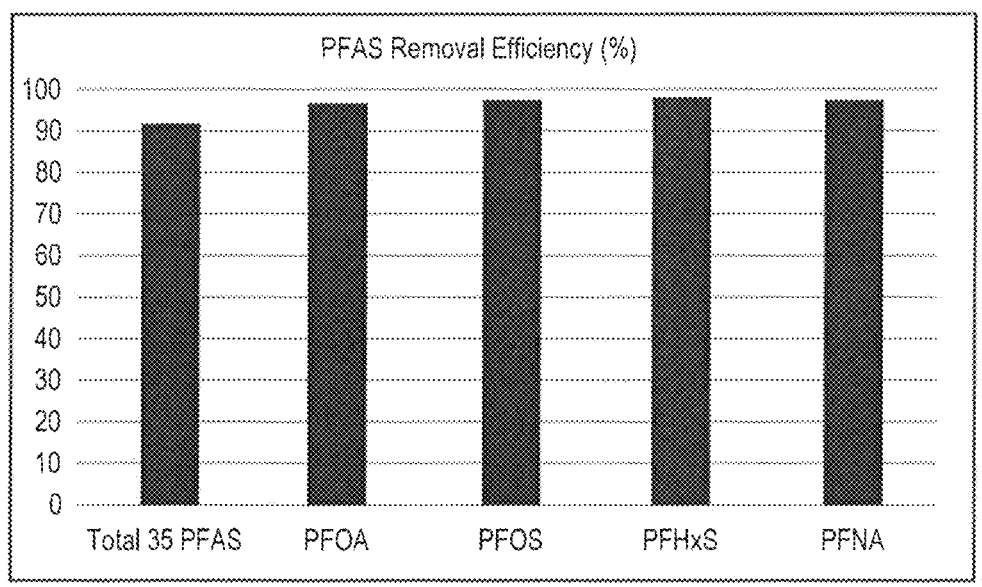
FIG. 11 is a graph showing the removal efficiency of Example 11 on the most common PFAS substances.

FIG. 10 is a graph showing the quantity of PFAS substances (out of a total of 35 PFAS substances) that had a removal efficiency of greater than or equal to 90%, greater than or equal to 95%, or greater than or equal to 97% for Example 11. FIG. 11 illustrates exemplary PFAS removal efficiency of Example 11 on most common PFAS substances. FIG. 11 shows, among 35 PFAS substances, over 90% removal was achieved on the 35 PFAS substances tested by Example 11, over 96% removal was achieved on PFOA by Example 11 and over 97% removal was achieved on PFOS by Example 11 and over 95% removal was achieved on PFHxS and over 98% removal on PFNA by the adsorbent of Example 11.

Disclosed herein is a method for adsorbing at least one PFAS from liquid. The liquid may include, but is not limited to, water (e.g., freshwater, sea water, or the like), edible oil, wastewater, process water or combinations thereof. For example, the liquid may include or may be water in oil, or oil in water. The method may comprise: mixing/contacting the liquid with any one of the products disclosed herein that comprise attapulgite that has been surface functionalized with a quaternary amine surface coating solution and a mercapto surface coating solution. The liquid and the product may form a slurry.

The mixing/contacting may occur for a contact time and loading amount of the product sufficient to reduce the amount of the PFAS in the liquid during the contact time such that a PFAS efficiency (for removal of the PFAS from the liquid) of 70-100%, 80-100%, 90-100%, 95-100% or 97-100% is achieved. For example, in an embodiment, the product may have a PFAS removal efficiency of 70% 100% in about 12-25 hours contact time in the liquid, at a loading of 0.5-2 g of the product per liter of the liquid; in a refinement, the product may have a PFAS removal efficiency of 80%-100% in about 12-25 hours contact time in the liquid, at a loading of 0.5-2 g of the product per liter of the liquid; in a refinement, the product may have a PFAS removal efficiency of 90% 100% in about 12-25 hours contact time in the liquid, at a loading of 0.5-2 g of the product per liter of the liquid; in another refinement, the product may have a PFAS removal efficiency of 95% 100% in about 12-25 hours contact time in the liquid, at a loading of 0.5-2 g of the product per liter of the liquid.

The quaternary amine surface coating solution may include water (e.g., DI water) and (a) a mono-quaternary amine compound comprising one or more mono-quaternary amines that attach to the attapulgite surface, or (b) a di-quaternary amine compound comprising one or more di-quaternary amines that that attach to the attapulgite surface. When the quaternary amine surface coating solution includes one or more mono-quaternary amine compounds, the quaternary amine surface coating solution (and the product) is free of di-quaternary amines. When the quaternary amine surface coating solution includes one or more di-quaternary amine compounds, the quaternary amine surface coating solution (and the product) is free of mono-quaternary amines. The mercapto surface coating solution may comprise a solvent and one or more mercapto groups that chemically bond to the attapulgite surface.

The method may further comprise separating the product from the liquid to recover a resultant liquid that has a lower amount of PFAS than the liquid had prior to the mixing, wherein the weight percentage of the components of the product includes: 85-94 wt. % attapulgite, 2.5-15 wt. % of (i) one or more mono-quaternary amines or (ii) one or more di-quaternary amines, and 1-8 wt. % surface coating agent that includes the one or more mercapto groups. The product may have a surface area in the range of 45-160 $m^2/g$ or 45-150 $m^2/g$ or 45-130 $m^2/g$ or 50-100 $m^2/g$ as measured using the BET method. For example, the resultant liquid may be recovered from the slurry by filtration or any other appropriate method known to those of skill in the art. The products disclosed herein may be used as body feed alone and/or precoat mixed with filter aids (such as diatomaceous earth and perlite) in the filtration system.

Other adsorption methods may be utilized. Such other adsorption methods may include passing PFAS containing liquids through columns packed with the dual surface functionalized attapulgite disclosed herein. The contact time may be adjusted by varying process parameters such as column length, column diameter, adsorbent packing density, and/or liquid flow rate, etc.

INDUSTRIAL APPLICABILITY

In general, the foregoing disclosure finds utility in the removal of PFAS contained in liquids. Historically, common commercially available PFAS removal technologies include activated carbon adsorption, anion exchange resin, and high-pressure membranes. Activated carbon is a less efficient technology. Anion exchange resin and high-pressure membranes technologies are expensive due to the high material cost and equipment cost.

The novel product disclosed herein can be used as an adsorbent for reducing PFAS in liquids. Such products have high removal efficiency for PFAS, which significantly reduces process time and provides greater removal of PFAS from liquids. Furthermore, compared to the commercially utilized activated carbon, the products disclosed herein may be used in significantly smaller quantities, which create less waste product to be disposed. For example, the novel product can used as body feed or pre-coat with or without filter aid in liquid filtration system to remove PFAS substances. It can also be used to cover PFAS contaminated sediment for PFAS soil remediation.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A product for adsorbing at least one PFAS in a liquid, the product comprising attapulgite that has been surface functionalized with: (a) a quaternary amine surface coating solution that includes a mono-quaternary amine compound or a di-quaternary amine compound, the mono-quaternary amine compound comprising one or more mono-quaternary amines that attach to the attapulgite surface, the di-quaternary amine compound comprising one or more di-quaternary amines that attach to the attapulgite surface, and (b) a surface coating agent that includes one or more mercapto groups that chemically bond to the attapulgite surface,
    wherein when the quaternary amine surface coating solution includes one or more mono-quaternary amine compounds, the product or the attapulgite is free of di-quaternary amines,
    wherein when the quaternary amine surface coating solution includes one or more di-quaternary amine compounds, the product or the attapulgite is free of mono-quaternary amines,
    wherein the product or the attapulgite has a surface area in the range of 45-160 $m^2/g$ as measured using the BET method,
    wherein the product or the attapulgite has a particle size distribution having a $d_{50}$ of 6-30 microns, and
    wherein the product comprises:
        85-94 wt. % of the attapulgite;
        2.5-15 wt. % of the (i) mono-quaternary amine(s) or (ii) di-quaternary amine(s); and
        1-8 wt. % of the surface coating agent.

2. The product of claim 1, wherein the surface coating agent is mercapto silane.

3. The product of claim 1, wherein the product is in powder form and/or free of extrusion.

4. The product of claim 1, wherein the product has a PFAS removal efficiency for the at least one PFAS of 70-100%, in 12-25 hours in the liquid at a loading of 0.5-2 g of the product per liter of the liquid.

5. The product of claim 1, wherein the product is free of oleyl amine and octyl amine.

6. The product of claim 1, wherein the product or the attapulgite is free of residual acid.

7. The product of claim 1, wherein:
    the surface area is in a range of 50-100 $m^2/g$; and
    the $d_{50}$ is in a range of 10-25 microns.

8. The product of claim 1, wherein the $d_{50}$ is in a range of 12-23 microns.

9. The product of claim 1, wherein the product has a PFAS removal efficiency for the at least one PFAS of 90-100%, in 12-25 hours in the liquid at a loading of 0.5-2 g of the product per liter of the liquid.

10. A method of producing a product for adsorbing at least one PFAS from a liquid, the method comprising:
    selecting an attapulgite as feed material, wherein prior to surface treatment, the attapulgite selected as the feed material contains 7-16 wt. % moisture when measured at a temperature of 104° C.;
    surface treating the attapulgite with a quaternary amine surface coating solution, the quaternary amine surface coating solution including (i) a mono-quaternary amine compound, the mono-quaternary amine compound comprising one or more mono-quaternary amines that attach to the surface of the attapulgite, or (ii) a di-quaternary amine compound, the di-quaternary amine compound comprising one or more di-quaternary amines that attach to the surface of the attapulgite; and surface treating the attapulgite with a mercapto surface coating solution, the mercapto surface coating solution including a surface coating agent that includes one or more mercapto groups that chemically bond to the surface of the attapulgite, wherein the product produced or surface treated attapulgite has a surface area in the range of 45-160 m²/g as measured using the BET method, wherein when the quaternary amine surface coating solution includes the mono-quaternary amine compound, the product or surface treated attapulgite is free of di-quaternary amines, wherein when the quaternary amine surface coating solution includes the di-quaternary amine compound, the product or surface treated attapulgite is free of mono-quaternary amines.

11. The method of claim 10, wherein the weight percentage of components of the product includes:

85-94 wt. % attapulgite;

2.5-15 wt. % of (i) one or more mono-quaternary amines or (ii) one or more di-quaternary amines; and 1-8 wt. % surface coating agent that includes the one or more mercapto groups, wherein the product is free of oleyl amine and octyl amine.

12. The method of claim 10,

Wherein the quaternary amine surface coating solution further includes water, wherein the mercapto surface coating solution further includes a solvent, wherein the surface coating agent comprises mercapto silane.

13. The method of claim 10, wherein the surface treating of the attapulgite with a mercapto surface coating solution is subsequent to the surface treating of the attapulgite with a quaternary amine surface coating solution.

14. The method of claim 13, wherein the quaternary amine surface coating solution further includes water.

15. The method of claim 10, wherein the product or surface treated attapulgite has a particle size distribution having a $d_{50}$ of 6-30 microns.

16. The method of claim 9, wherein the product has a PFAS removal efficiency for the at least one PFAS of 70-100%, in 12-25 hours in the liquid at a loading of 0.5-2 g of the product per liter of the liquid.

17. The method of claim 10, wherein:

the attapulgite selected as the feed material contains 9-14 wt. % moisture; and the product has a particle size distribution having a $d_{50}$ of 10-25 microns.

18. The method of claim 10, wherein:

the product has a particle size distribution having a $d_{50}$ of 12-23 microns; and/or the product has a PFAS removal efficiency for the at least one PFAS of 95-100%, in 12-25 hours in the liquid at a loading of 0.5-2 g of the product per liter of the liquid.

19. A method for adsorbing at least one PFAS in a liquid, the method comprising:

contacting the liquid with a product comprising attapulgite that has been surface functionalized with (a) a quaternary amine surface coating solution that includes a mono-quaternary amine compound or a di-quaternary amine compound, the mono-quaternary amine compound comprising one or more mono-quaternary amines that attach to the attapulgite surface, the di-quaternary amine compound comprising one or more di-quaternary amines that attach to the attapulgite surface, and (b) a surface coating agent that includes one or more mercapto groups that chemically bond to the attapulgite surface; and separating the product from the liquid to recover a resultant liquid that has a lower amount of PFAS than the liquid had prior to the mixing, wherein the weight percentage of the components of the product includes: 85-94 wt. % attapulgite, 2.5-15 wt. % of (i) one or more mono-quaternary amines or (ii) one or more di-quaternary amines, and 1-8 wt. % surface coating agent that includes the one or more mercapto groups, wherein when the quaternary amine surface coating solution includes one or more mono-quaternary amine compounds, the product or the attapulgite is free of di-quaternary amine compounds, wherein when the quaternary amine surface coating solution includes one or more di-quaternary amine compounds, the product or the attapulgite is free of mono-quaternary amine compounds, wherein the product or the attapulgite has a surface area in the range of 45-160 m²/g as measured using the BET method, wherein the removal efficiency of the product for a PFAS is 10-100%, at a loading of 0.5-2 g of the product per liter of the liquid.

20. The method of claim 19, wherein the liquid includes water, edible oil, wastewater, process water, or combinations thereof.

21. The method of claim 19, wherein the surface coating agent comprises mercapto silane.

22. The method of claim 19, wherein when the contacting is for 12-25 hours, the removal efficiency of the product for the PFAS is 70-100%, at the loading of 0.5-2 g of the product per liter of the liquid.

23. The method of claim 19, wherein when the contacting is for 12-25 hours, the removal efficiency of the product for the PFAS is 80-100%, at the loading of 0.5-2 g of the product per liter of the liquid.

24. The method of claim 19, wherein when the contacting is for 12-25 hours, the removal efficiency of the product for the PFAS is 95-100% at the loading of 0.5-2 g of the product per liter of the liquid.

25. A product for adsorbing at least one PFAS in a liquid, the product comprising attapulgite that has been surface functionalized with: (a) a quaternary amine surface coating solution that includes a mono-quaternary amine compound or a di-quaternary amine compound, the mono-quaternary amine compound comprising one or more mono-quaternary amines that attach to the attapulgite surface, the di-quaternary amine compound comprising one or more di-quaternary amines that attach to the attapulgite surface, and (b) a surface coating agent that includes one or more mercapto groups that chemically bond to the attapulgite surface, wherein when the quaternary amine surface coating solution includes one or more mono-quaternary amine compounds, the product is free of di-quaternary amines, wherein when the quaternary amine surface coating solution includes one or more di-quaternary amine compounds, the product is free of mono-quaternary amines, wherein the product or the attapulgite has a surface area in the range of 45-160 m²/g as measured using the BET method, wherein the product or the attapulgite has a particle size distribution having a $d_{50}$ of 6-30 microns, and wherein the product or the attapulgite has a porosity of 40-90% and a pore volume of 0.7-1.5 mL/g.

26. The product of claim 25, wherein the surface coating agent is mercapto silane.

27. The product of claim 25, wherein the product is free of oleyl amine and octyl amine.

28. The product of claim 25, wherein the product or the attapulgite is free of residual acid.

* * * * *